US009868350B2

(12) United States Patent
Murakawa et al.

(10) Patent No.: US 9,868,350 B2
(45) Date of Patent: Jan. 16, 2018

(54) WORKING VEHICLE

(71) Applicant: KUBOTA CORPORATION, Osaka (JP)

(72) Inventors: Masatake Murakawa, Osaka (JP); Masaru Nakaji, Hyogo (JP); Tatsuya Nose, Osaka (JP); Takashi Fujii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 19 days.

(21) Appl. No.: 14/483,428

(22) Filed: Sep. 11, 2014

(65) Prior Publication Data

US 2015/0210163 A1    Jul. 30, 2015

(30) Foreign Application Priority Data

Jan. 27, 2014    (JP) ................. 2014-012209

(51) Int. Cl.
*B60K 17/28* (2006.01)
*B60K 5/02* (2006.01)
*B60K 5/00* (2006.01)

(52) U.S. Cl.
CPC ............... *B60K 17/28* (2013.01); *B60K 5/02* (2013.01); *B60K 2005/003* (2013.01); *B60Y 2200/86* (2013.01)

(58) Field of Classification Search
CPC .......... B60K 5/00; B60K 17/28; B60K 25/06; B60K 2005/003; B60K 2005/006; B60K 5/02; B60Y 2200/86
See application file for complete search history.

(56) References Cited

U.S. PATENT DOCUMENTS

| 2,027,638 | A | * | 1/1936 | Forsberg | ................. | F02B 67/04 |
| | | | | | | 180/53.7 |
| 2,450,080 | A | * | 9/1948 | Richey | ................... | B62D 49/00 |
| | | | | | | 180/53.7 |
| 3,371,543 | A | * | 3/1968 | Jackson | .................... | B60P 3/16 |
| | | | | | | 180/53.7 |
| 4,403,671 | A | * | 9/1983 | Schmahl | .............. | A01B 59/048 |
| | | | | | | 180/233 |

(Continued)

FOREIGN PATENT DOCUMENTS

JP    5285488    9/2013

*Primary Examiner* — Paul N Dickson
*Assistant Examiner* — Timothy Wilhelm
(74) *Attorney, Agent, or Firm* — Greenblum & Bernstein, P.L.C.

(57) ABSTRACT

Provided is a working vehicle which includes: an engine disposed on a rear portion of a vehicle body; a gear-type transmission and an HST which are disposed on the rear portion of the vehicle body; a load-carrying platform disposed above at least one of the engine, the gear-type transmission and the HST; a driving operation part disposed in front of the load-carrying platform and allowing an operator to ride thereon; a PTO shaft mounted on a front portion of the vehicle body and being capable of taking out power to the outside of the working vehicle; and a mechanical power transmission mechanism for transmitting the power from the engine which is before the power is transmitted with a speed change by the gear-type transmission and the HST to the PTO shaft by extending below the driving operation part.

26 Claims, 21 Drawing Sheets

(56) References Cited

U.S. PATENT DOCUMENTS

| | | | | |
|---|---|---|---|---|
| 4,618,016 A | * | 10/1986 | van der Lely | B60K 17/28 |
| | | | | 180/312 |
| 4,621,699 A | * | 11/1986 | Slazas | B60K 17/28 |
| | | | | 180/53.7 |
| 4,811,614 A | | 3/1989 | Lasoen | |
| 4,811,804 A | * | 3/1989 | Ewers | A62C 27/00 |
| | | | | 169/24 |
| 5,289,730 A | * | 3/1994 | Wilson | B60K 17/28 |
| | | | | 180/247 |
| 5,469,931 A | * | 11/1995 | Kawata | B60K 17/24 |
| | | | | 180/379 |
| 6,089,340 A | * | 7/2000 | Galli | B60K 17/28 |
| | | | | 180/53.1 |
| 6,237,708 B1 | * | 5/2001 | Kawada | B60K 17/28 |
| | | | | 180/53.7 |
| 6,409,457 B1 | | 6/2002 | Korycan et al. | |
| 6,533,053 B2 | * | 3/2003 | Hayden | B60K 25/06 |
| | | | | 180/53.7 |
| 8,298,107 B1 | * | 10/2012 | Brookins | F16H 3/722 |
| | | | | 475/275 |
| 8,776,939 B2 | | 7/2014 | Kuramoto | |
| 8,950,525 B2 | * | 2/2015 | Marotte | B60K 25/06 |
| | | | | 180/53.7 |
| 2008/0271939 A1 | * | 11/2008 | Yasuda | A01D 69/002 |
| | | | | 180/308 |
| 2010/0025058 A1 | | 2/2010 | Carter et al. | |

\* cited by examiner

Fig.2
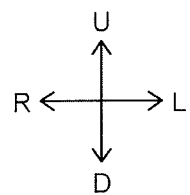
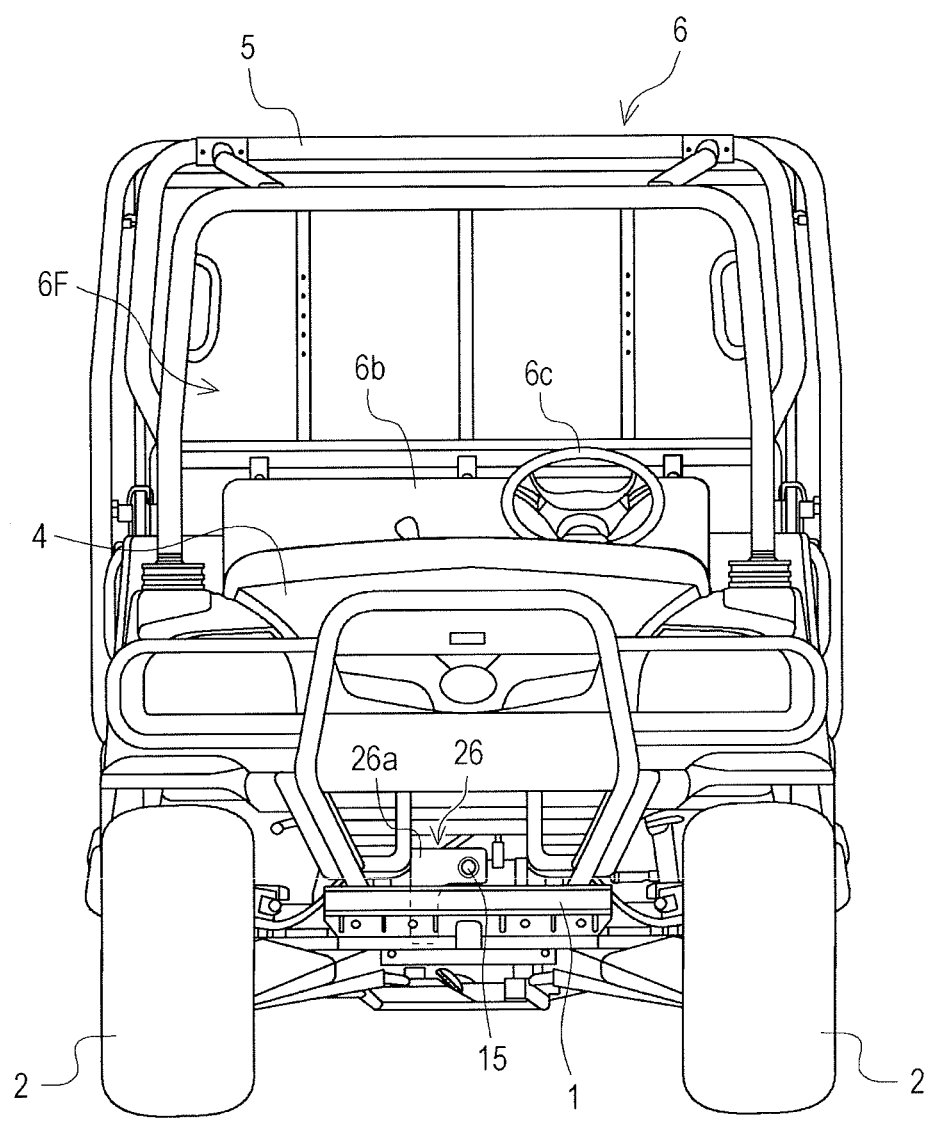

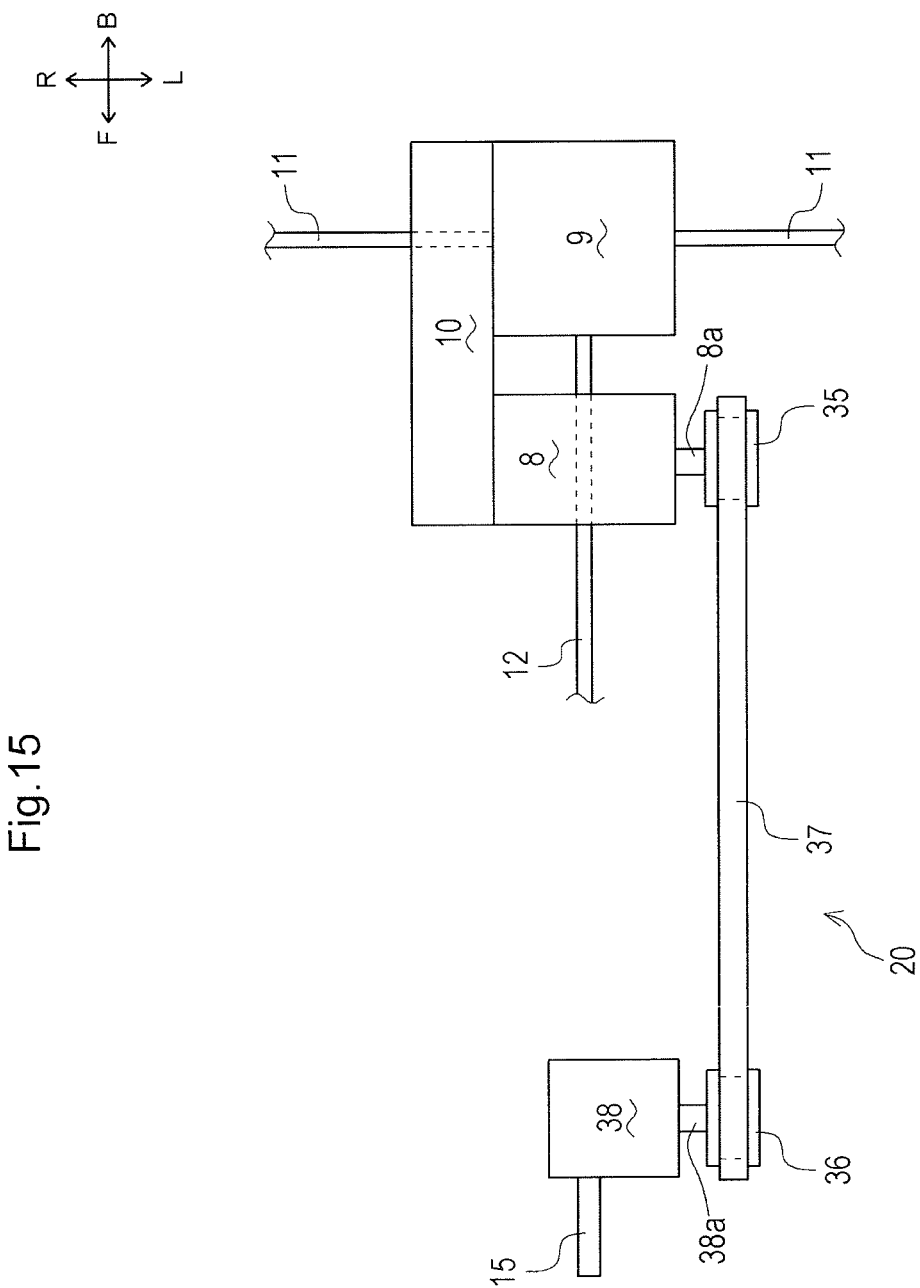

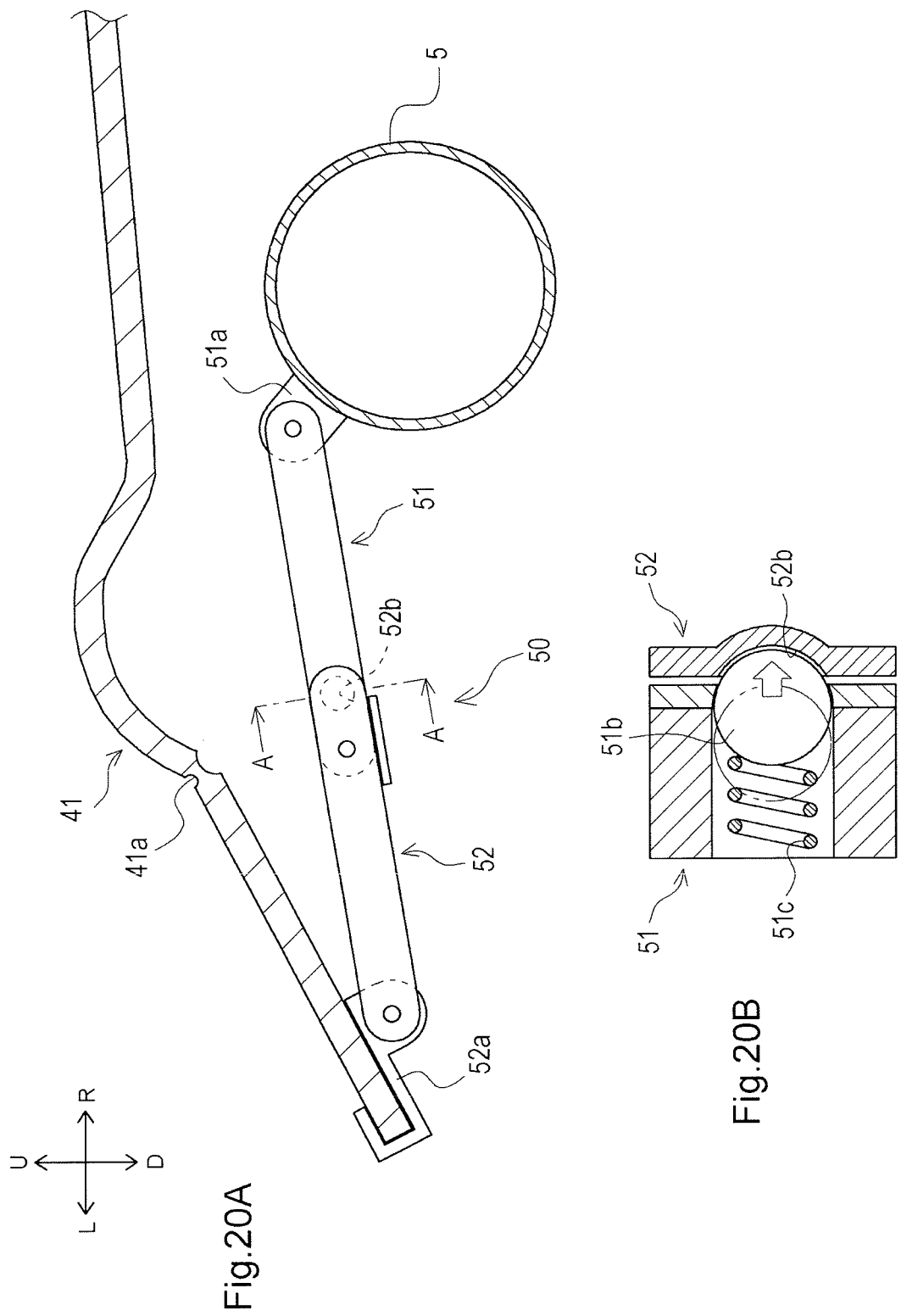

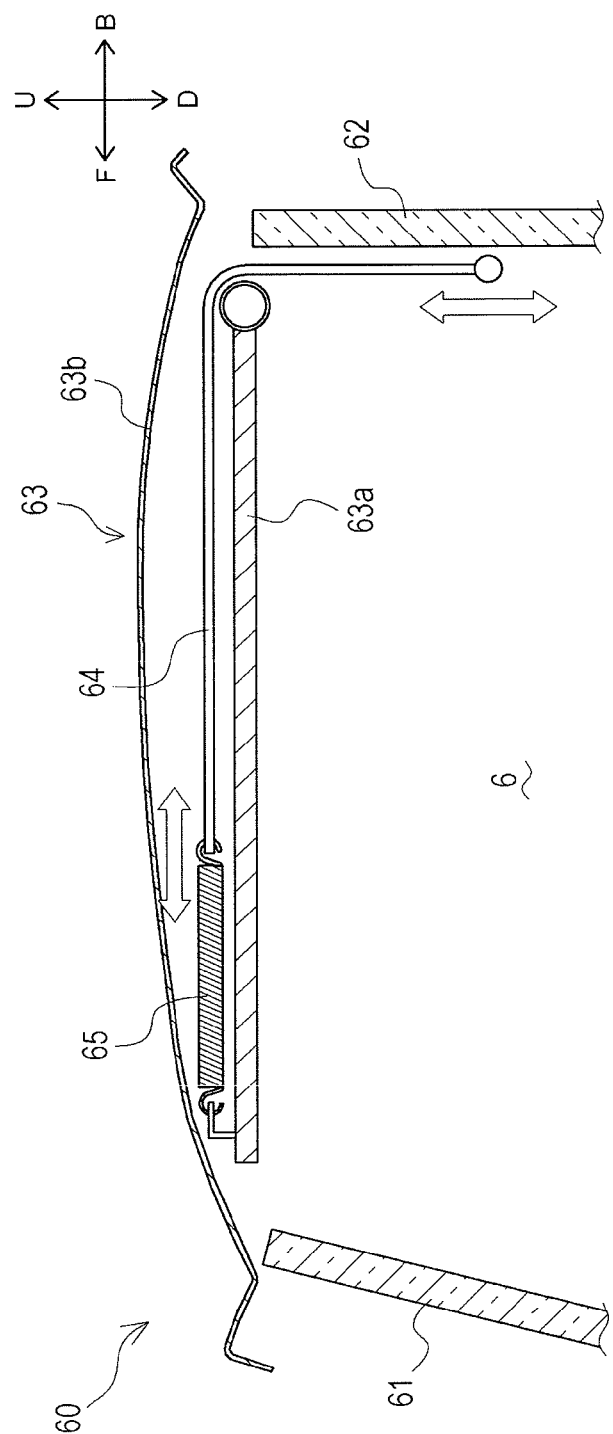
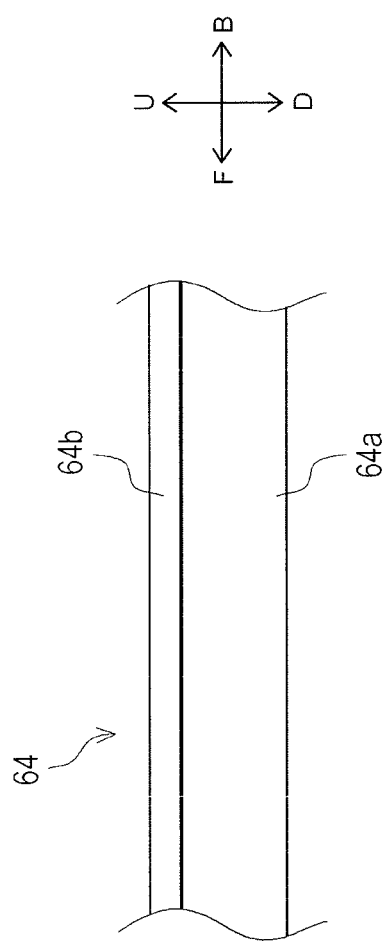
Fig.21A
Fig.21B (1)

WORKING VEHICLE

TECHNICAL FIELD

The disclosure relates to a technique of a working vehicle provided with a load-carrying platform disposed on a rear portion of a vehicle body.

BACKGROUND ART

Conventionally, there has been known a technique of a working vehicle provided with a load-carrying platform disposed on a rear portion of a vehicle body. For example, JP 5285488 B2 discloses such a technique.

JP 5285488 B2 discloses a working vehicle which can travel by transmitting power from an engine to a front wheel and a rear wheel by means of a traveling power transmission device. An operator can desirably move or perform transport operation using such a working vehicle.

On the other hand, with respect to such a working vehicle, there has been a demand for a working vehicle where various working devices (such as a snow blower which performs snow removing operation and a mower which performs mowing operation) driven by rotational power from an engine (hereinafter simply referred to as "power") can be mounted on a front portion of a vehicle body. By mounting the working device on the front portion of the vehicle body, a person who drives the working vehicle (operator) can drive the working vehicle while confirming a mode of operation performed by the working device with his/her naked eyes.

To drive such a working device, it is necessary to take out power from the engine to the outside from the front portion of the vehicle body. However, JP 5285488 B2 does not describe the configuration for taking out power from the engine from the front portion of the vehicle body, and the power cannot be taken out from the front portion of the vehicle body.

SUMMARY OF INVENTION

In view of the above-mentioned circumstances, an object of the disclosure is to provide a working vehicle which can take out power from an engine from a front portion of a vehicle body.

The problem to be solved by the disclosure has been described above, and means for solving the problem is now described.

Specifically, a working vehicle according to the disclosure includes: an engine disposed on a rear portion of a vehicle body; a transmission disposed on the rear portion of the vehicle body and for transmitting power from the engine to a drive wheel with a speed change; a load-carrying platform disposed above at least one of the engine and the transmission; a driving operation part disposed in front of the load-carrying platform and allowing an operator to ride thereon; a PTO shaft mounted on a front portion of the vehicle body and being capable of taking out power to outside of the working vehicle; and a mechanical power transmission mechanism for transmitting the power from the engine which is before the power from the engine is transmitted with a speed change by the transmission to the PTO shaft by extending below the driving operation part.

As effects of the disclosure, the following effects are obtained.

In the working vehicle of the disclosure, power from the engine can be mechanically transmitted to the front portion of the vehicle body, and the power can be taken out from the front portion of the vehicle body. Accordingly, various working devices which are mounted on the front portion of the vehicle body can be driven. Further, by allowing the mounting of a working device which can be mounted on a front portion of another working vehicle (such as a tractor) also on the working vehicle of the disclosure, the working device can be used in common by both working vehicles.

BRIEF DESCRIPTION OF DRAWINGS

FIG. 2 is a front view showing the overall configuration of the working vehicle according to the first embodiment of the disclosure;

FIG. 15 is a schematic plan view showing a mechanical power transmission mechanism according to an eighth embodiment;

FIG. 20A is a cross-sectional back view showing the left end portion of the roof expanded to outside, and FIG. 20B is a cross-sectional view taken along line A-A in FIG. 20A; and FIG. 21A is a cross-sectional side view showing a configuration of a cabin, and FIG. 21B is an enlarged side view of a sunshade.

DESCRIPTION OF EMBODIMENTS

Figure 1:
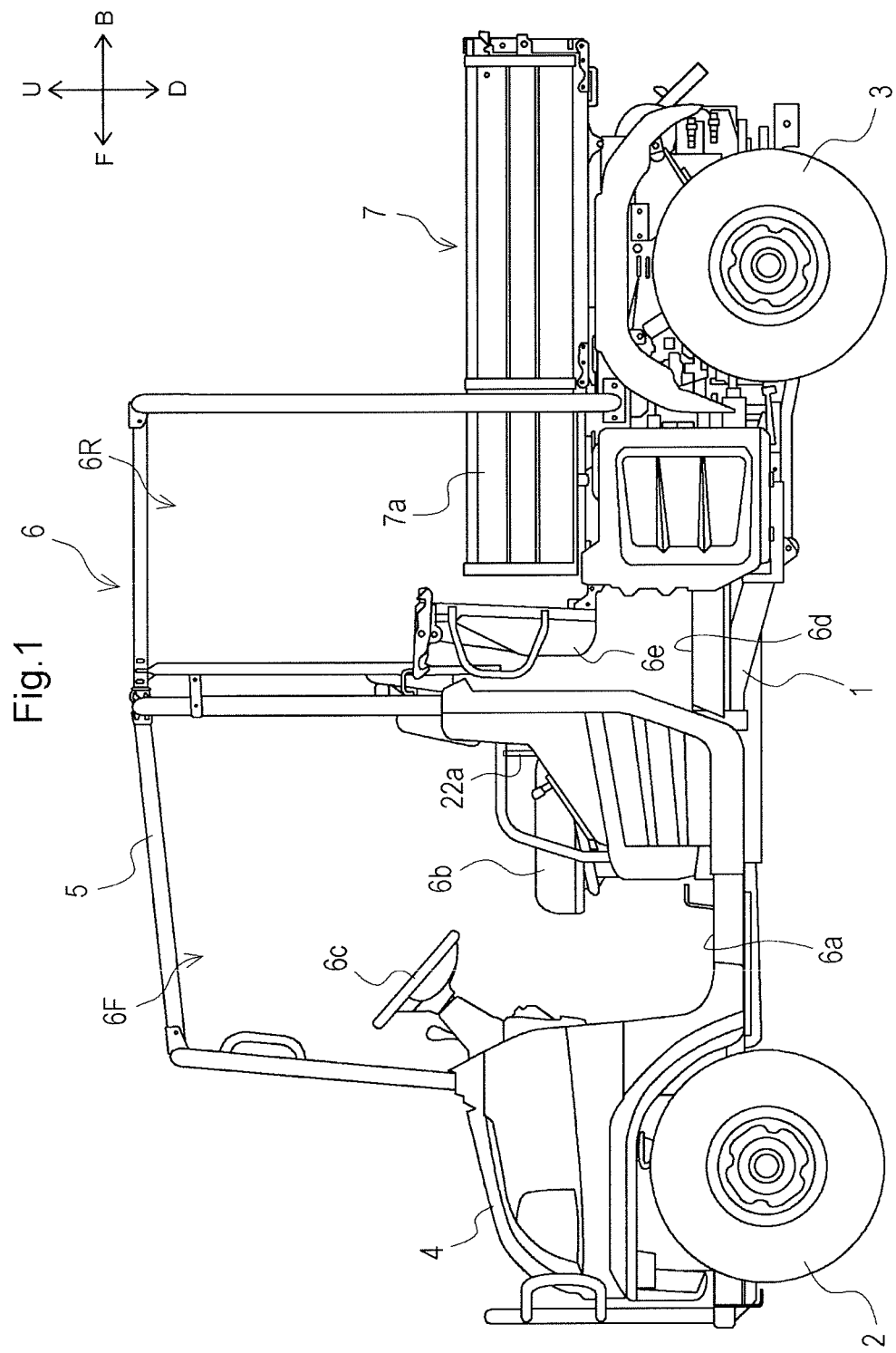
FIG. 1 is a side view showing an overall configuration of a working vehicle according to a first embodiment of the disclosure.

Hereinafter, description is made by defining the direction indicated by an arrow U in the drawings as an upward direction, the direction indicated by an arrow D in the drawings as a downward direction, the direction indicated by an arrow L in the drawings as a leftward direction, the direction indicated by an arrow R in the drawings as a rightward direction, the direction indicated by an arrow F in the drawings as a frontward direction, and the direction indicated by an arrow B in the drawings as a backward direction.

An overall configuration of a working vehicle according to one embodiment (first embodiment) of the disclosure is described hereinafter with reference to FIG. 1 and FIG. 2.

The working vehicle includes a main frame 1 as a main structural body of a vehicle body thereof. The main frame 1 is formed by combining pipe members, plate members and the like and extends in the longitudinal direction. A front portion of the main frame 1 is supported on a pair of left and right front wheels 2, and a rear portion of the main frame 1 is supported on a pair of left and right rear wheels 3. The front wheels 2 and the rear wheels 3 are drivable wheels (drive wheels). A front cover 4 is mounted on the front portion of the main frame 1 so as to cover the main frame 1 from above. A protective frame 5 is disposed above an intermediate portion of the main frame 1 in the longitudinal direction. A driving operation part 6 on which an operator rides is formed in an approximately rectangular parallelepiped space defined by the protective frame 5. The driving operation part 6 is divided into a front row part 6F formed on a front portion of the driving operation part 6 and a rear row part 6R formed on a rear portion of the driving operation part 6.

In the front row part 6F, a front deck plate 6a which forms a horizontal floor surface (a surface on which an operator places his/her leg when the operator rides on the working vehicle (leg placing surface)) is disposed. The front deck plate 6a is suitably fixed to the main frame 1. A front seat 6b on which the operator is seated is mounted in the front row part 6F. A steering wheel 6c and various manipulators which are manipulable by an operator sitting on the front seat 6b are disposed in the front row part 6F.

A rear deck plate 6d which forms a horizontal floor surface (leg placing surface) is disposed in the rear row part 6R. The rear deck plate 6d is suitably fixed to the main frame 1 at a position slightly higher than a position of the front deck plate 6a. A rear seat 6e on which an operator is seated is mounted in the rear row part 6R. The rear seat 6e is supported in a rotatable manner about a rotary shaft which is mounted on a front lower portion of the rear seat 6e.

A load-carrying platform 7 is mounted on a rear upper portion of the main frame 1. A collapsible shape-variable portion 7a is formed in the vicinity of a front end portion of the load-carrying platform 7. The shape-variable portion 7a is formed such that the shape-variable portion 7a extends frontward into the inside of the rear row part 6R of the driving operation part 6. A rear end portion of the load-carrying platform 7 is formed such that the rear end portion extends to a position behind the rear wheels 3 in the longitudinal direction.

In a state shown in FIG. 1, the rear seat 6e is rotated frontward, and the shape-variable portion 7a of the load-carrying platform 7 is disposed in a space which is ensured by the rotation of the rear seat 6e. In such a state, an operator can ride at the front row part 6F of the driving operation part 6. On the other hand, when the shape-variable portion 7a of the load-carrying platform 7 is collapsed and the rear seat 6e is rotated rearward, the operator can also ride at the rear row part 6R of the driving operation part 6. In this manner, the working vehicle can be changed over between two modes: a two-row seat mode where operators can be seated on the front seat 6b and the rear seat 6e and a one-row seat mode where an operator can be seated only on the front seat 6b (see FIG. 1). In the one-row seat mode, by expanding the shape-variable portion 7a of the load-carrying platform 7, a capacity of the load-carrying platform 7 can be increased.

Hereinafter, a configuration relating to a power transmission path in the working vehicle is described with reference to FIG. 3 to FIG. 5.

Figure 3:
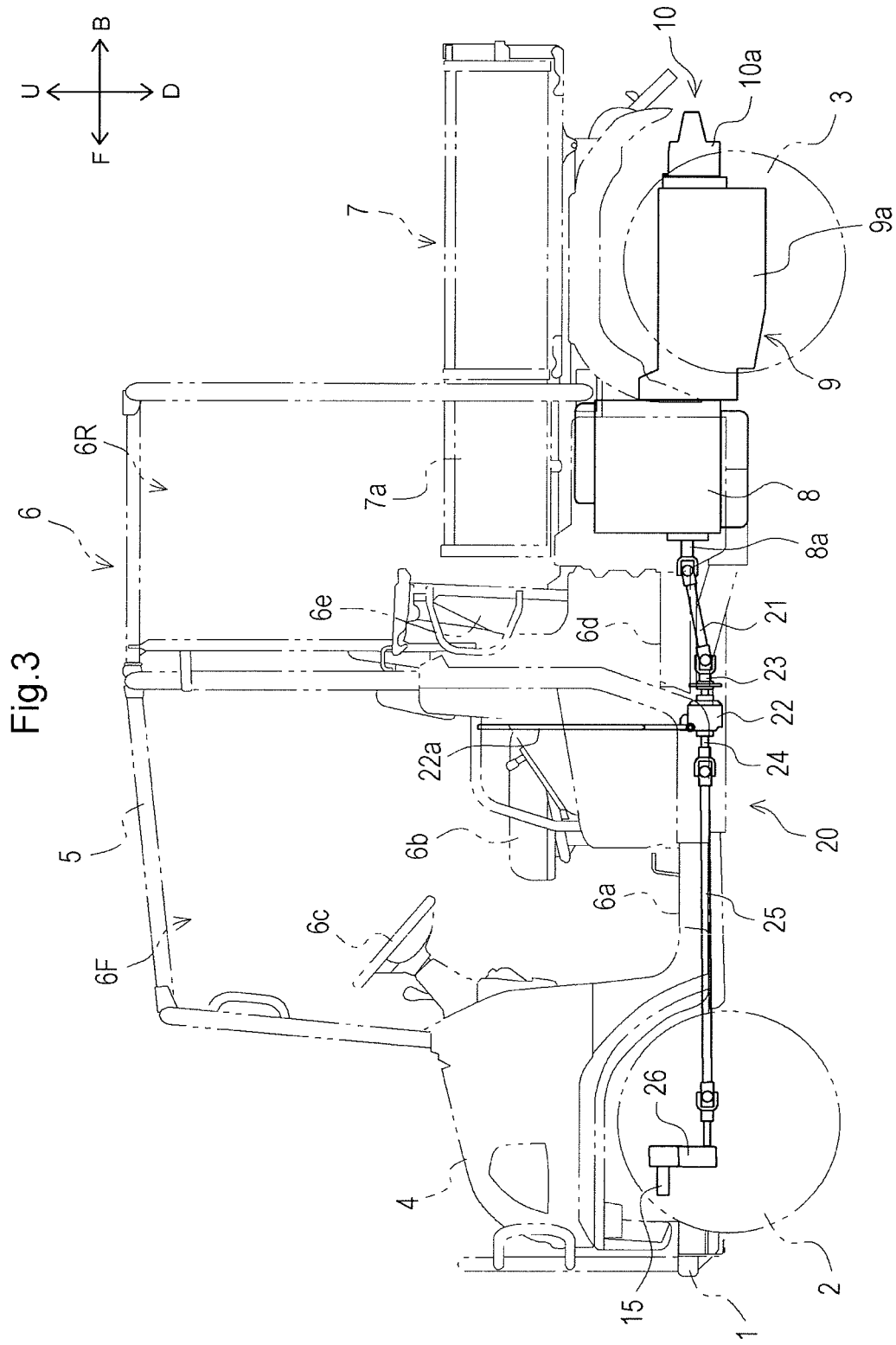
FIG. 3 is a side view showing a configuration relating to a power transmission path in the working vehicle.
Figure 4:
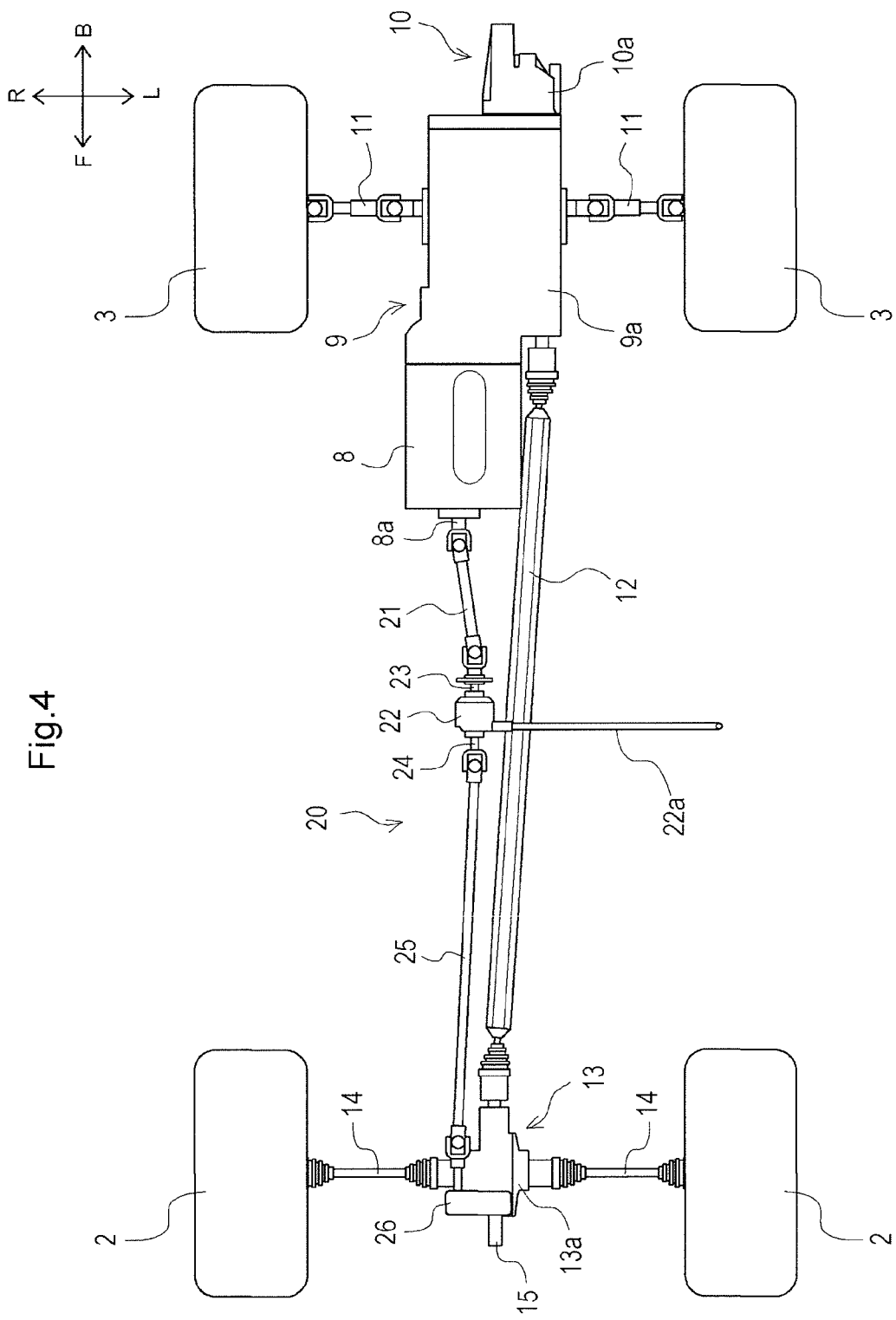
FIG. 4 is a plan view showing the configuration relating to the power transmission path in the working vehicle.

As shown in FIG. 3 and FIG. 4, an engine 8 is disposed on a rear portion of the vehicle body of the working vehicle (to be more specific, a lower side of the shape-variable portion 7a of the load-carrying platform 7). The engine 8 is disposed such that the longitudinal direction of a crankshaft which is housed in the inside of the engine 8 is directed in the longitudinal direction of the vehicle. A gear-type transmission device 9 which is housed in a transmission case 9a is disposed behind the engine 8 and below the load-carrying platform 7. The engine 8 is fixed to a right side of a front side surface of the transmission case 9a. An HST (hydrostatic continuously variable transmission) 10 which is housed in an HST case 10a is disposed behind the transmission case 9a and below the load-carrying platform 7. The HST case 10a is fixed to a rear side surface of the transmission case 9a.

The gear-type transmission device 9 and the HST 10 constitute one specific mode of a transmission according to the disclosure.

A pair of left and right rotary shafts 11 is connected to the gear-type transmission device 9. The left and right rotary shafts 11 are disposed so as to extend outward from both left and right side surfaces of the transmission case 9a, respectively. Outer end portions of the left and right rotary shafts 11 are connected to the left and right rear wheels 3, respectively.

A front wheel drive shaft 12 is connected to the gear-type transmission device 9. The front wheel drive shaft 12 is disposed so as to extend frontward from a left side of the front side surface of the transmission case 9a. The front wheel drive shaft 12 is connected to a front wheel differential mechanism 13 which is housed in a differential case 13a. The front wheel differential mechanism 13 is disposed at substantially the center between the pair of left and right front wheels 2. A pair of left and right rotary shafts 14 is connected to the front wheel differential mechanism 13. The left and right rotary shafts 14 are disposed so as to extend outward from both left and right side surfaces of the differential case 13a, respectively. Outer end portions of the left and right rotary shafts 14 are connected to the left and right front wheels 2, respectively.

In FIG. 3, for the sake of convenience, the illustration of the front wheel drive shaft 12, the front wheel differential mechanism 13, and the rotary shafts 14 is omitted.

A mechanical power transmission mechanism 20 is connected to the engine 8. A rear end portion of the mechanical power transmission mechanism 20 is connected to a power takeout shaft 8a which is connected to a front end portion of the crankshaft. The mechanical power transmission mechanism 20 is disposed so as to extend frontward. A front end portion of the mechanical power transmission mechanism 20 is connected to a PTO shaft 15 which is disposed on a front portion of the vehicle body of the working vehicle (to be more specific, at substantially the center between the pair of left and right front wheels 2).

The mechanical power transmission mechanism 20 and the PTO shaft 15 are described in detail later.

In the working vehicle having the above-mentioned configuration, a rotational speed of the engine 8 can be arbitrarily adjusted by an engine rotational speed manipulator (not shown) disposed in the driving operation part 6. As shown in FIG. 4 and FIG. 5, power from the engine 8 is transmitted to the HST 10 from a rear end portion of the crankshaft by way of a shaft (not shown) which is disposed in the inside of the transmission case 9a, and power is transmitted with a speed change by the HST 10. A speed change ratio of the HST 10 can be adjusted continuously by a speed change manipulator (not shown) mounted on the driving operation part 6. Power which is transmitted with a speed change by the HST 10 is transmitted to the gear-type transmission device 9, and is further transmitted with a speed change by the gear-type transmission device 9 (for example, changeover between forward traveling and backward traveling, changeover between high-speed traveling and low-speed traveling and the like). A speed change stage in the gear-type transmission device 9 can be changed over by the speed change manipulator (not shown) disposed in the driving operation part 6.

Power which is transmitted with a speed change by the gear-type transmission device 9 is transmitted to the left and right rear wheels 3 by way of the rotary shafts 11. The rear wheels 3 are driven by the transmitted power. On the other hand, the power which is transmitted with a speed change by the gear-type transmission device 9 is transmitted to the front wheel differential mechanism 13 by way of the front wheel drive shaft 12. The power which is transmitted to the front wheel differential mechanism 13 is transmitted to the left and right front wheels 2 by way of the rotary shafts 14. The front wheels 2 are driven by the transmitted power.

Further, power from the engine 8 is transmitted to the PTO shaft 15 from a front end portion of the crankshaft by way of the power takeout shaft 8a and the mechanical power transmission mechanism 20. The PTO shaft 15 is rotatably driven by the transmitted power. Power can be taken out to the outside from the PTO shaft 15. For example, by connecting a desired working device (such as a snow blower which performs snow removal operation or a mower which performs mowing operation) to the PTO shaft 15, it is possible to drive the working device using the power from the engine 8 of the working vehicle.

Power transmitted to the PTO shaft 15 is the power from the engine 8 before the power is transmitted with a speed change by the HST 10 and the gear-type transmission device 9. Accordingly, irrespective of a speed change ratio of the HST 10 and the gear-type transmission device 9 (eventually, a traveling speed of the working vehicle), power corresponding to a rotational speed of the engine 8 can be taken out from the PTO shaft 15.

Hereinafter, the configuration of the mechanical power transmission mechanism 20 and the PTO shaft 15 is described in detail with reference to FIG. 6 to FIG. 10.

The mechanical power transmission mechanism 20 is provided for transmitting power from the engine 8 before the power from the engine 8 is transmitted with a speed change by the HST 10 and the gear-type transmission device 9 to the PTO shaft 15 by extending below the driving operation part 6. The mechanical power transmission mechanism 20 includes, as main components thereof, a rear transmission shaft 21, a clutch unit 22, a clutch input shaft 23, a clutch output shaft 24, a front transmission shaft 25 and a speed reduction mechanism 26.

Figure 6:
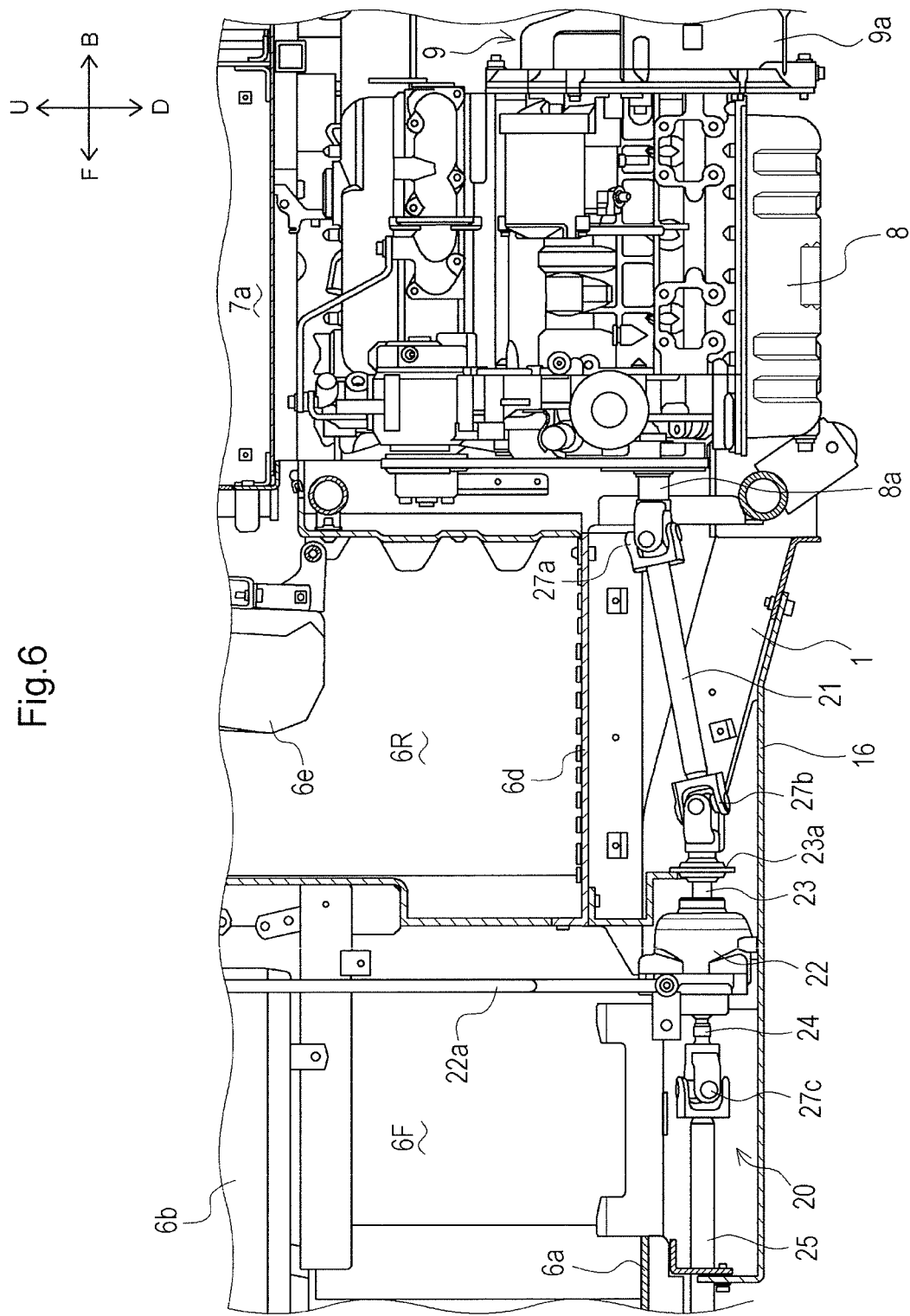
FIG. 6 is an enlarged cross-sectional side view showing a rear portion of a mechanical power transmission mechanism.
Figure 7:
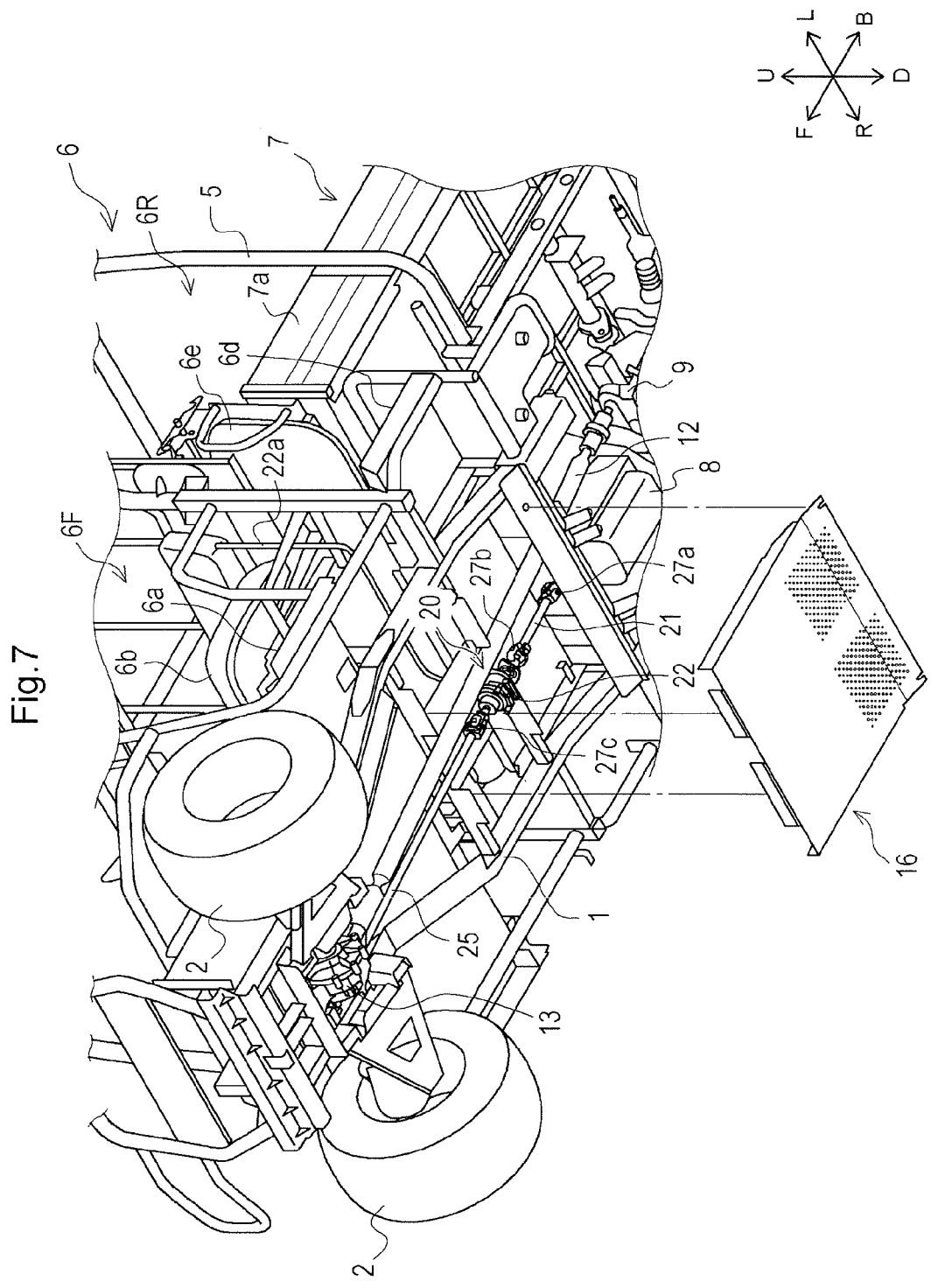
FIG. 7 is an exploded perspective view showing the mechanical power transmission mechanism as viewed from a lower side.
Figure 8:
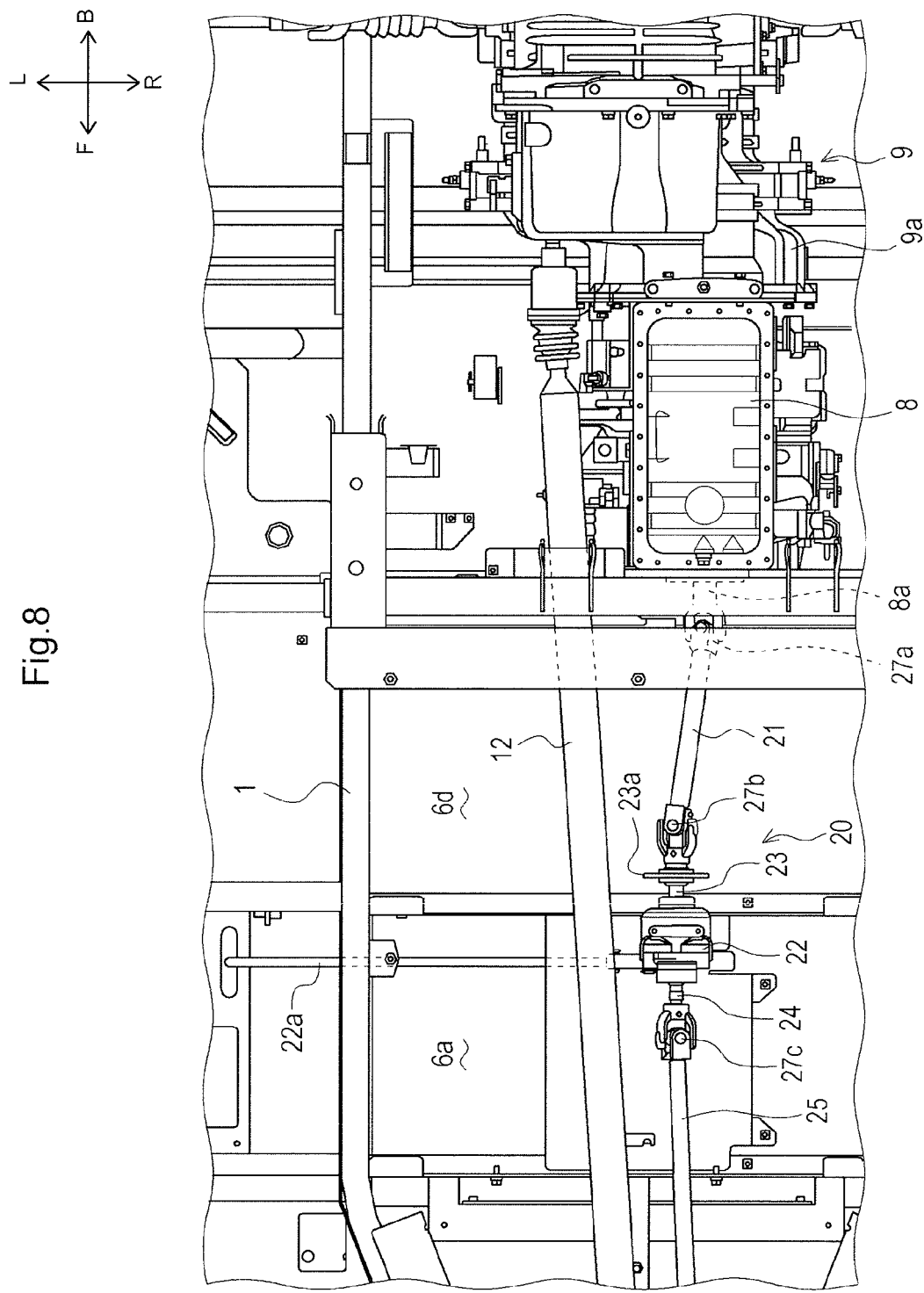
FIG. 8 is an enlarged bottom plan view showing a rear portion of the mechanical power transmission mechanism.

The rear transmission shaft 21 shown in FIG. 6 to FIG. 8 is provided for transmitting power from the power takeout shaft 8a to the clutch input shaft 23 (described later) by connecting the power takeout shaft 8a of the engine 8 and the clutch input shaft 23 to each other. The rear transmission shaft 21 is disposed in front of the engine 8. A rear end of the rear transmission shaft 21 is connected to the power takeout shaft 8a by way of a first universal joint 27a. A front end of the rear transmission shaft 21 is disposed so as to extend frontward and downward. Due to such a configuration, the rear transmission shaft 21 is disposed in an inclined manner toward a front lower side from a rear upper side.

The rear deck plate 6d of the rear row part 6R is disposed in front of the engine 8. The engine 8 according to this embodiment is disposed such that the power takeout shaft 8a is positioned lower than the rear deck plate 6d of the rear row part 6R (to be more specific, being positioned at the same height as the front deck plate 6a of the front row part 6F) (see FIG. 6). Accordingly, the rear transmission shaft 21 connected to the power takeout shaft 8a is positioned below the rear deck plate 6d.

The clutch unit 22 is provided for changing over the transmission of power performed by way of the clutch unit 22 between a power transmission mode and a power non-transmission mode. The clutch unit 22 is disposed in front of a front end of the rear transmission shaft 21 (below a rear end portion of the front row part 6F). The clutch unit 22 is also disposed below the driving operation part 6 (to be more specific, the front row part 6F) in the longitudinal direction.

In this embodiment, the clutch unit 22 is formed of a wet multi-plate clutch. However, the disclosure is not limited to such a clutch, and other kinds of clutches (for example, an electromagnetic clutch, an engaging clutch and the like) can be adopted as the clutch unit 22.

A manipulation lever 22a for operating the clutch unit 22 is mounted on the clutch unit 22. The manipulation lever 22a is formed in a leftwardly extending manner from the clutch unit 22 as well as in the upwardly extending manner from a left end portion of the clutch unit 22. Due to such a configuration, an upper end portion of the manipulation lever 22a is positioned on a left side of the front seat 6b disposed in the front row part 6F. An operator who is seated in the front row part 6F can change over the transmission of power by the clutch unit 22 between a power transmission mode and a power non-transmission mode by operating the manipulation lever 22a.

The clutch input shaft 23 is provided for transmitting power from the rear transmission shaft 21 to the clutch unit 22 by connecting the rear transmission shaft 21 and the clutch unit 22 to each other. The clutch input shaft 23 is disposed with an axial direction thereof directed in the longitudinal direction. A rear end of the clutch input shaft 23 is connected to a front end of the rear transmission shaft 21 by way of a second universal joint 27b. A front end of the clutch input shaft 23 is connected to the clutch unit 22.

An intermediate portion of the clutch input shaft 23 is rotatably supported on a bearing unit 23a which is fixed to the main frame 1. Due to such a configuration, it is possible to prevent whirling of the clutch input shaft 23.

The clutch output shaft 24 is provided for transmitting power from the clutch unit 22 to the front transmission shaft 25 (described later) by connecting the clutch unit 22 and the front transmission shaft 25 to each other. The clutch output shaft 24 is disposed with an axial direction thereof directed in the longitudinal direction. A rear end of the clutch output shaft 24 is connected to the clutch unit 22. A front end of the clutch output shaft 24 is disposed in a frontwardly extending manner.

The front transmission shaft 25 shown in FIG. 6 to FIG. 10 is provided for transmitting power from the clutch output shaft 24 to the speed reduction mechanism 26 (described later) by connecting the clutch output shaft 24 and the speed reduction mechanism 26 to each other. The front transmission shaft 25 is disposed substantially horizontally with an axial direction thereof directed in the longitudinal direction below the front deck plate 6a of the driving operation part 6. A rear end of the front transmission shaft 25 is connected to a front end of the clutch output shaft 24 by way of a third universal joint 27c. A front end of the front transmission shaft 25 is disposed in a frontwardly extending manner to an area in the vicinity of an intermediate portion between the pair of left and right front wheels 2.

Figure 9:
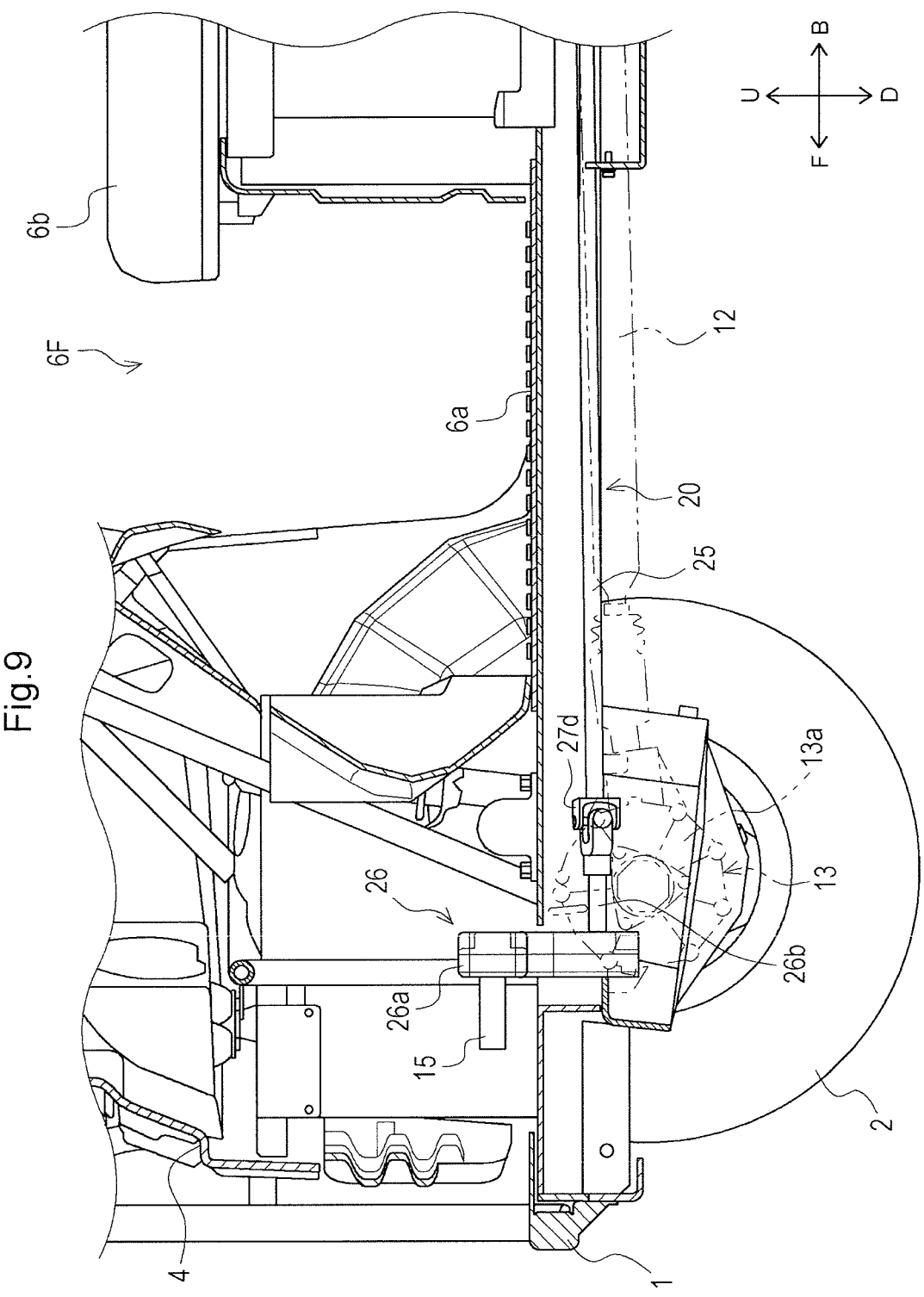
FIG. 9 is an enlarged cross-sectional side view showing a front portion of the mechanical power transmission mechanism.
Figure 10:
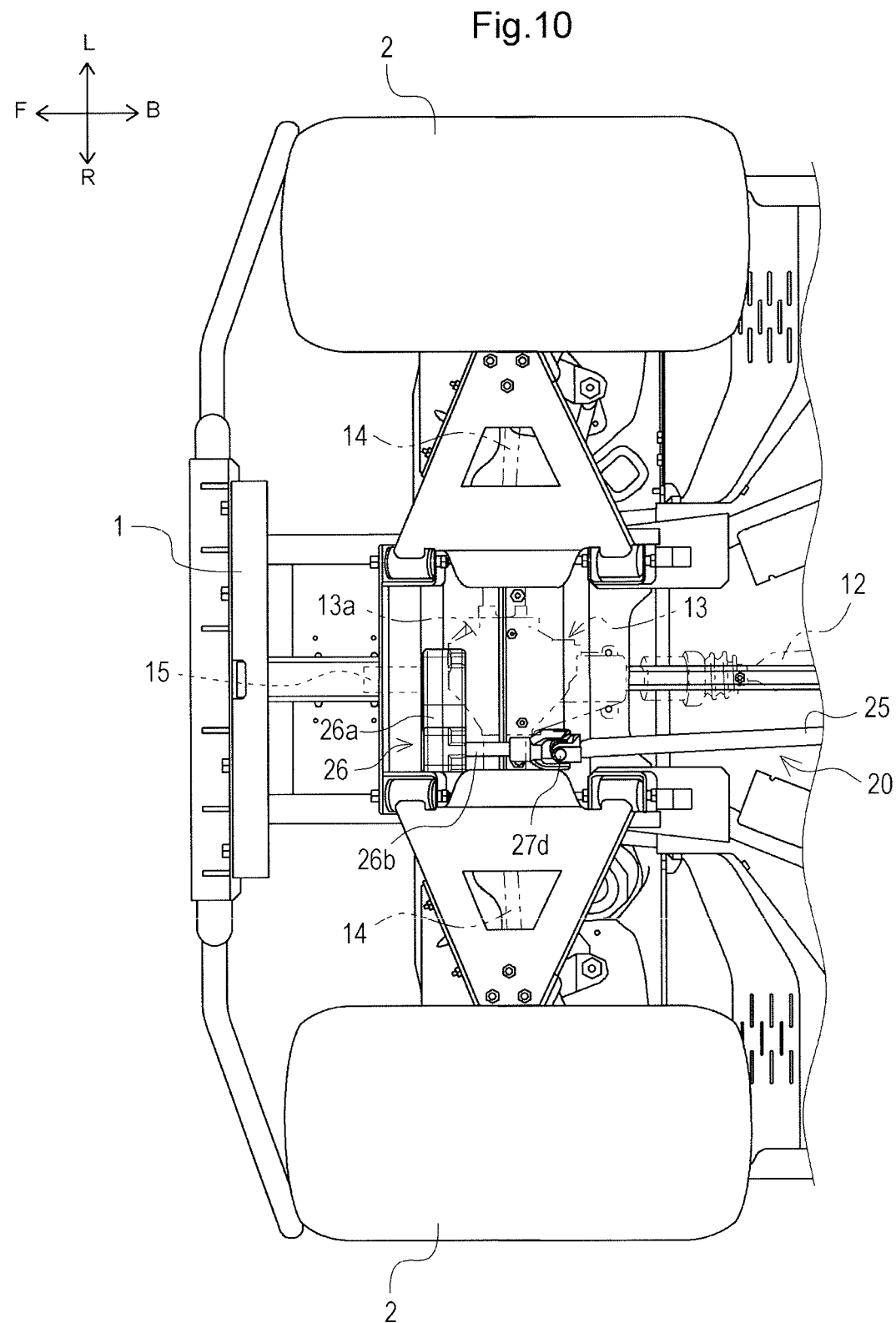
FIG. 10 is an enlarged bottom plan view showing the front portion of the mechanical power transmission mechanism.

The speed reduction mechanism 26 shown in FIG. 9 and FIG. 10 is provided for transmitting power to be transmitted to the PTO shaft 15 with speed reduction. The speed reduction mechanism 26 is constituted of a box-shaped speed reduction case 26a, gears and shafts (not shown) which are housed in the speed reduction case 26a, and an input shaft 26b. A speed reduction ratio in power transmission by the speed reduction mechanism 26 is preliminarily set to a desired value.

The speed reduction case 26a is disposed in the vicinity of the intermediate portion between the pair of left and right front wheels 2 and below the front cover 4. The speed reduction case 26a is disposed in an extending manner in the vertical direction from a lower side to an upper side of the front deck plate 6a of the driving operation part 6.

The input shaft 26b is disposed in the vicinity of a lower end portion of a rear side surface of the speed reduction case 26a (to be more specific, a portion of the driving operation part 6 positioned below the front deck plate 6a) in a rearwardly projecting manner. A front end portion of the input shaft 26b is connected to the gears and the like in the inside of the speed reduction case 26a. A rear end portion of the input shaft 26b is connected to a front end portion of the front transmission shaft 25 by way of a fourth universal joint 27d.

The PTO shaft 15 is provided for taking out power to the outside of the working vehicle. The PTO shaft 15 is disposed with an axial direction thereof directed in the longitudinal direction. The PTO shaft 15 is disposed in a frontwardly projecting manner from an area in the vicinity of an upper end portion of a front side surface of the speed reduction case 26a (to be more specific, a portion positioned above the front deck plate 6a of the driving operation part 6). A rear end portion of the PTO shaft 15 is connected to the gears and the like in the inside of the speed reduction case 26a. The PTO shaft 15 is disposed at the center of the working vehicle in the lateral direction below the front cover 4 (at a position viewable from a front side (see FIG. 2)). Due to such a configuration, the PTO shaft 15 is disposed (offset) at a position where the PTO shaft 15 does not overlap with the front end (input shaft 26b) of the front transmission shaft 25 as viewed in a front view by way of the speed reduction mechanism 26.

The power takeout shaft 8a of the engine 8 constitutes one specific mode of a power take-out portion according to the disclosure.

The rear transmission shaft 21, the clutch input shaft 23, the clutch output shaft 24, and the front transmission shaft 25 constitute one specific mode of a power transmission shaft according to the disclosure.

The rear transmission shaft 21 constitutes one specific mode of a first transmission shaft according to the disclosure.

The clutch input shaft 23, the clutch output shaft 24, and the front transmission shaft 25 constitute one specific mode of a second transmission shaft according to the disclosure.

As shown in FIG. 6 and FIG. 7, the protective plate 16 is fixed to a bottom portion of the main frame 1. The protective plate 16 is formed by suitably bending a plate-shaped member along the bottom portion of the main frame 1. The protective plate 16 is disposed so as to cover an intermediate portion of the mechanical power transmission mechanism 20 (to be more specific, a portion ranging from an intermediate portion of the rear transmission shaft 21 to an intermediate portion of the front transmission shaft 25) from below. With the use of the protective plate 16, it is possible to prevent foreign substances such as soil and grass from adhering to the mechanical power transmission mechanism 20 (particularly, the second universal joint 27b and the third universal joint 27c), thus preventing the generation of defects in the mechanical power transmission mechanism 20.

As described above, the mechanical power transmission mechanism 20 can transmit power from the engine 8 to the PTO shaft 15 by extending below the driving operation part 6 (the front deck plate 6a and the rear deck plate 6d). The mechanical power transmission mechanism 20 can mechanically transmit power from the engine 8 (using the plurality of shafts and gears) and hence, a transmission loss of power can be suppressed to a low level.

By arranging the rear transmission shaft 21 in an inclined manner, the front transmission shaft 25 which is connected to the rear transmission shaft 21 and the like can be disposed at a height different from a height of the power takeout shaft 8a of the engine 8 (particularly at a position lower than a position of the power takeout shaft 8a) (see FIG. 6). Due to such an arrangement, the mechanical power transmission mechanism 20 can be easily disposed below the driving operation part 6, thus avoiding the interference between the mechanical power transmission mechanism 20 and the driving operation part 6. Further, the engine 8 can be disposed at a higher position irrespective of the positions of the front transmission shaft 25 and the like and hence, a large distance (height) can be ensured between a ground surface and the engine 8.

The mechanical power transmission mechanism 20 (particularly, the front transmission shaft 25) is disposed along the front wheel drive shaft 12 (that is, substantially parallel to the front wheel drive shaft 12 in the vicinity of the front wheel drive shaft 12) (see FIG. 7 to FIG. 10). Due to such a configuration, the mechanical power transmission mechanism 20 can be easily disposed by making use of a space where the front wheel drive shaft 12 is disposed.

In the first embodiment, the gear-type transmission device 9 is housed in the transmission case 9a, and the HST 10 is housed in the HST case 10a. However, the disclosure is not limited to the first embodiment. For example, a portion of the HST 10 may be housed in the transmission case 9a.

The configuration of the transmission according to the disclosure is not limited to the configuration which includes the gear-type transmission device 9 and the HST 10 according to the first embodiment. For example, the transmission may adopt the configuration which uses a belt-type CVT (continuously variable transmission) in place of the HST 10, or the transmission may adopt the configuration which includes only the gear-type transmission device 9.

The configuration of the mechanical power transmission mechanism according the disclosure is not limited to the configuration of the mechanical power transmission mechanism 20 according to the first embodiment. That is, it is sufficient that the mechanical power transmission mechanism 20 can mechanically transmit power from the engine 8 to the PTO shaft 15 by extending below the driving operation part 6.

For example, the clutch unit 22 can be disposed at an arbitrary position. However, when the manipulation lever 22a which is disposed so as to extend to the driving operation part 6 is mounted on the clutch unit 22, it is desirable to arrange the clutch unit 22 in the vicinity of the driving operation part 6 (below the driving operation part 6).

Further, the manipulator for operating the clutch unit 22 is not limited to the manipulation lever 22a which is mechanically connected to the clutch unit 22. For example, a switch for electrically operating the clutch unit 22 or the like may be adopted as the manipulator.

The mechanical power transmission mechanism 20 may be detachably mounted on the working vehicle.

In the first embodiment, the load-carrying platform 7 is disposed above the engine 8, the gear-type transmission device 9 and the HST 10. However, the disclosure is not limited to such an arrangement. For example, the disclosure may adopt the configuration where the load-carrying platform 7 is disposed only above the gear-type transmission device 9 and the HST 10 (the configuration where other members (for example, the driving operation part 6) are disposed above the engine 8).

In the first embodiment, the PTO shaft 15 is disposed above the front deck plate 6a. However, the disclosure is not limited to such an arrangement. That is, the PTO shaft 15 can be disposed at an arbitrary height.

In the first embodiment, the engine 8 is disposed such that the power takeout shaft 8a is disposed at the same height as the front deck plate 6a. However, the disclosure is not limited to such an arrangement. That is, the engine 8 can be disposed at an arbitrary height. For example, the engine 8 may be disposed such that the power takeout shaft 8a is disposed at a position higher than a position of the front deck plate 6a.

With respect to a swing angle of a connection portion formed of the universal joint included in the mechanical power transmission mechanism 20, an upper angular limit (an allowable angle) within which the mechanical power transmission mechanism 20 can be properly operated is preliminarily set. Accordingly, it is preferable that the mechanical power transmission mechanism 20 is configured to satisfy such an allowable angle. For example, it is preferable that a swing angle of the connection portion (first universal joint 27a) between the rear transmission shaft 21 and the power takeout shaft 8a is set equal to or smaller than an allowable angle (for example, 30°) of the first universal joint 27a. Further, by setting the angle of the first universal joint 27a to an angle (for example, 25° or below) which is further smaller than the allowable angle, noises generated from the first universal joint 27a can be also suppressed.

Hereinafter, another embodiment of the working vehicle according to the disclosure is described.

Firstly, a working vehicle according to a second embodiment is described with reference to FIG. 11.

Figure 11A:
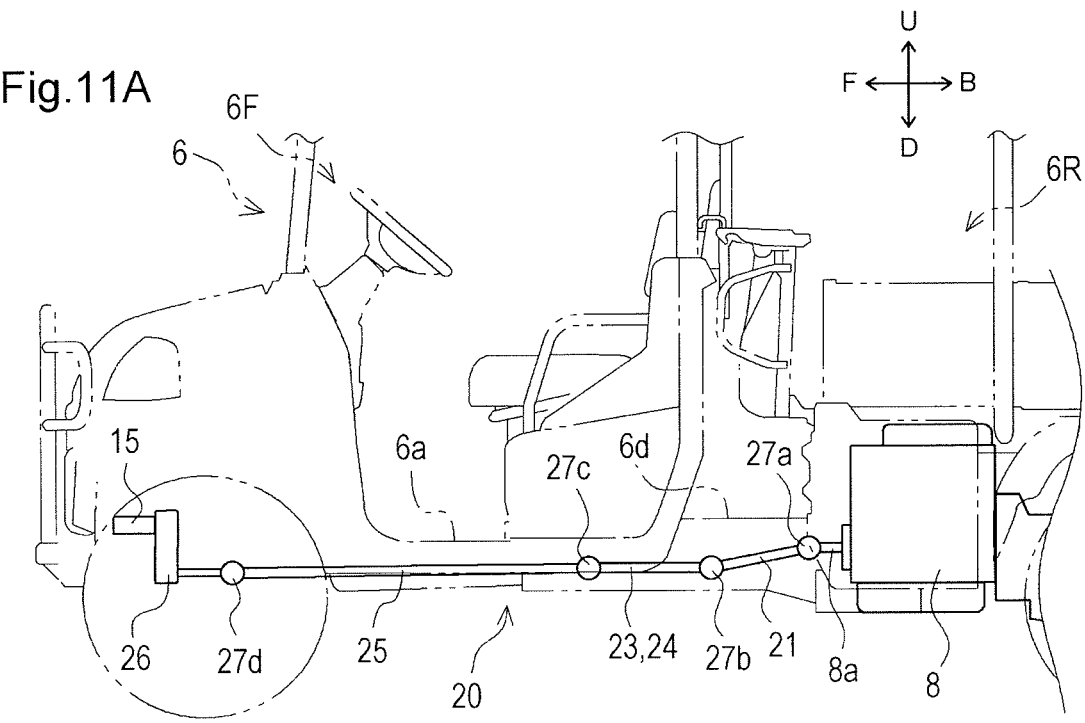
FIG. 11A is a schematic side view showing the mechanical power transmission mechanism according to the first embodiment.
Figure 11B:
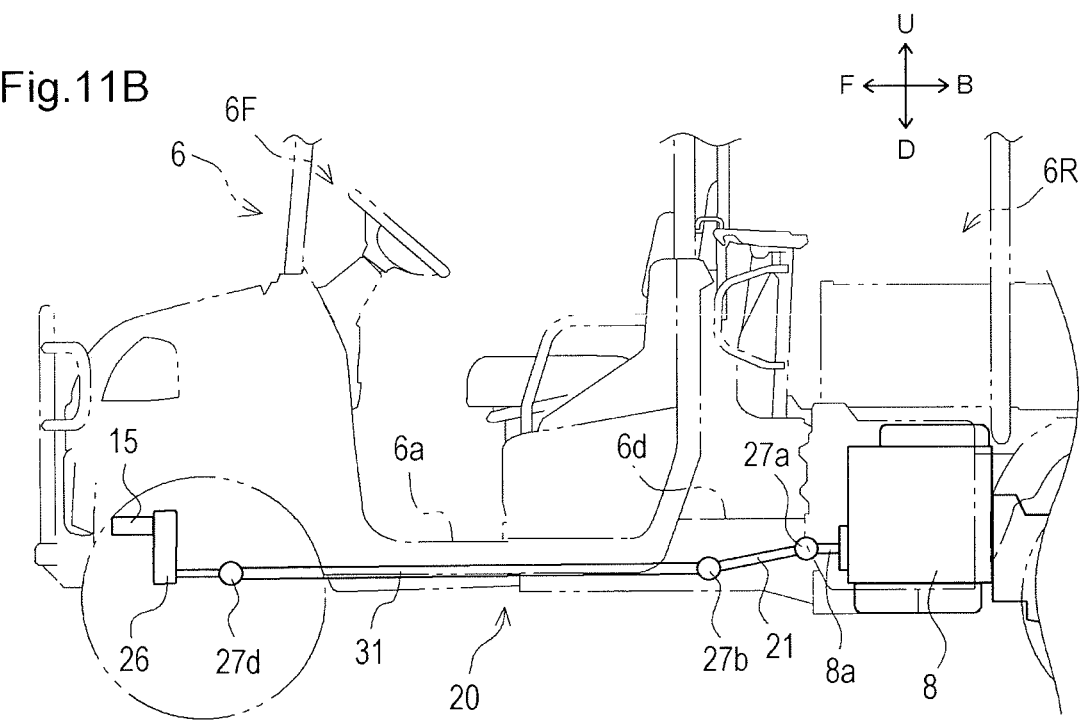
FIG. 11B is a schematic side view showing a mechanical power transmission mechanism according to a second embodiment.

In the working vehicle according to the first embodiment, as shown in FIG. 11A, the mechanical power transmission mechanism 20 includes the rear transmission shaft 21, the clutch input shaft 23, the clutch output shaft 24, and the front transmission shaft 25. However, in the working vehicle according to the second embodiment (see FIG. 11B), a mechanical power transmission mechanism 20 includes two shafts (a rear transmission shaft 21 and a second transmission shaft 31). In this case, a second universal joint 27b and a fourth universal joint 27d are connected to each other by the second transmission shaft 31 in place of the clutch input shaft 23, the clutch output shaft 24 and the front transmission shaft 25 according to the first embodiment. Due to such a configuration, compared to the working vehicle according to the first embodiment, one universal joint (the third universal joint 27c) can be eliminated and hence, the structure of the mechanical power transmission mechanism 20 can be simplified.

Figure 12A:
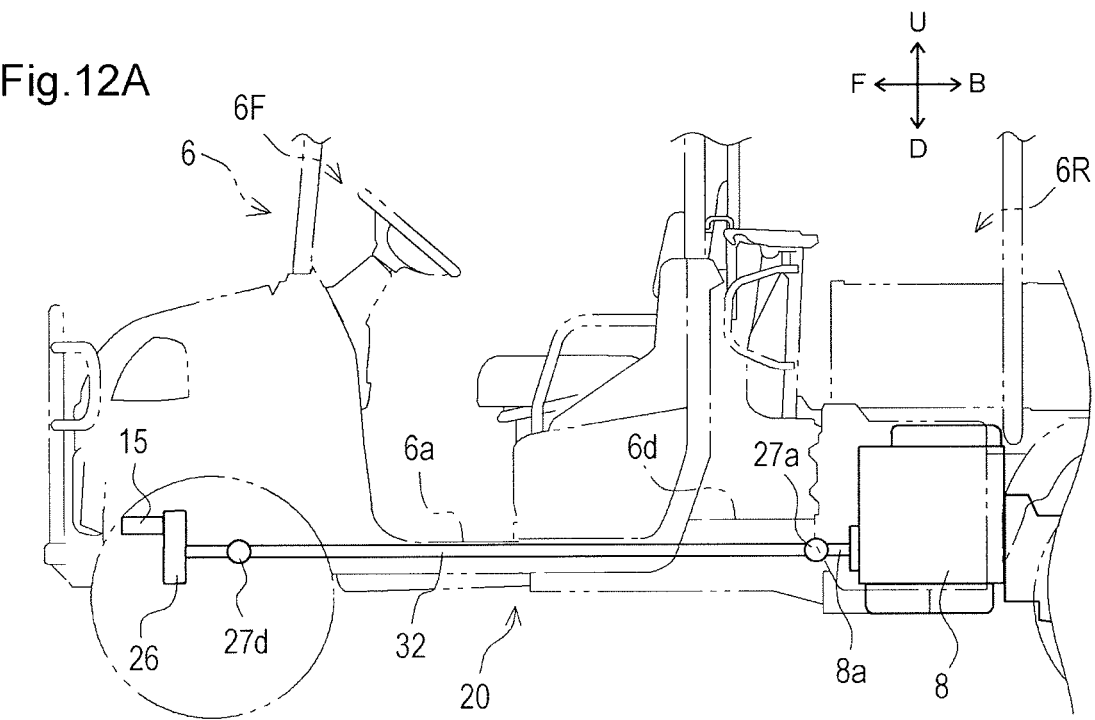
FIG. 12A is a schematic side view showing a mechanical power transmission mechanism according to a third embodiment.

Next, a working vehicle according to a third embodiment is described with reference to FIG. 12A.

In the working vehicle according to the third embodiment, a mechanical power transmission mechanism 20 includes one shaft (a third transmission shaft 32). The third transmission shaft 32 is disposed in an extending manner from a rear portion to a front portion of a vehicle body of the working vehicle. In this case, a first universal joint 27a and a fourth universal joint 27d are connected to each other by the third transmission shaft 32. Due to such a configuration, compared to the working vehicle according to the first embodiment, two universal joints (the second universal joint 27b and the third universal joint 27c) can be eliminated and hence, the structure of the mechanical power transmission mechanism 20 can be simplified.

Next, a working vehicle according to a fourth embodiment is described with reference to FIG. 12B.

In the working vehicle according to the fourth embodiment, a mechanical power transmission mechanism 20 further includes a rear speed reduction mechanism 33 in addition to the configuration according to the third embodiment.

The rear speed reduction mechanism 33 is provided for transmitting power of an engine 8 to a third transmission shaft 32 after transmitting the power with the speed reduction. The rear speed reduction mechanism 33 is disposed just in front of the engine 8. The rear speed reduction mechanism 33 is connected to a power takeout shaft 8a of the engine 8, and transmits the power from the power takeout shaft 8a to the third transmission shaft 32 after the reduction of speed. Due to such a configuration, by transmitting the power with reduction of speed to the third transmission shaft 32 by the rear speed reduction mechanism 33, it is possible to suppress a rotational speed of the third transmission shaft 32 to a low level. Accordingly, it is possible to suppress the whirling of the third transmission shaft 32, and it is also possible to decrease a diameter of the third transmission shaft 32.

By connecting the third transmission shaft 32 to the power takeout shaft 8a by way of the rear speed reduction mechanism 33, the third transmission shaft 32 can be disposed in an offset manner with respect to the power takeout shaft 8a.

Figure 12B:
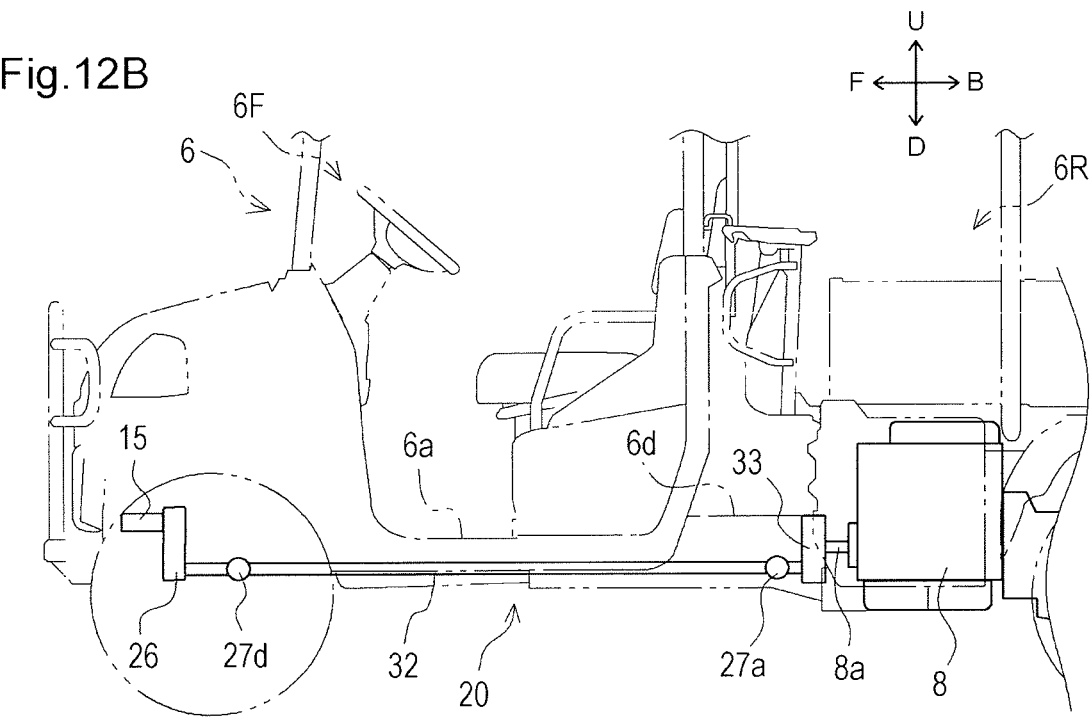
FIG. 12B is a schematic side view showing a mechanical power transmission mechanism according to a fourth embodiment.

For example, as shown in FIG. 12B, by arranging the third transmission shaft 32 in a downwardly offset manner with respect to the power takeout shaft 8a, the third transmission shaft 32 can be disposed at a lower position. Due to such an arrangement, it is possible to easily avoid the interference between the third transmission shaft 32 and the driving operation part 6.

Further, it may be also possible to mount a clutch capable of changing over the transmission of power by way of the rear speed reduction mechanism 33 between a transmission mode and a non-transmission mode on the speed reduction mechanism 33.

Next, a working vehicle according to a fifth embodiment and a working vehicle according to a sixth embodiment are described with reference to FIG. 13.

Figure 13A:
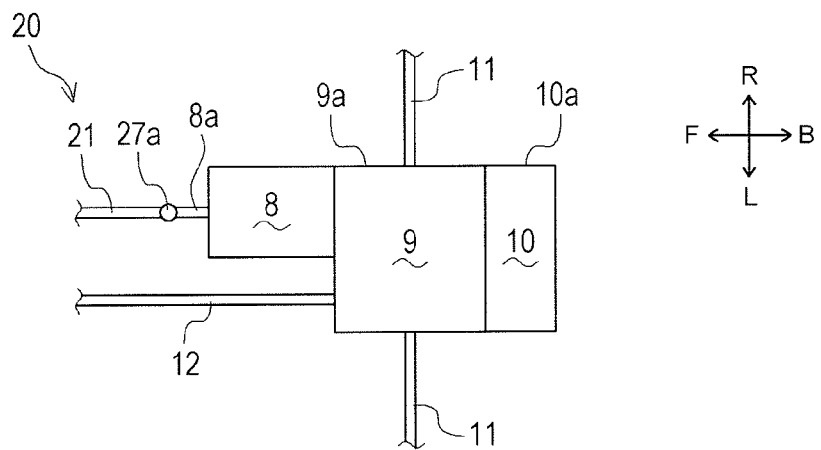
FIG. 13A is a schematic plan view showing an arrangement of an engine, a gear-type transmission device, and an HST according to the first embodiment.
Figure 13B:
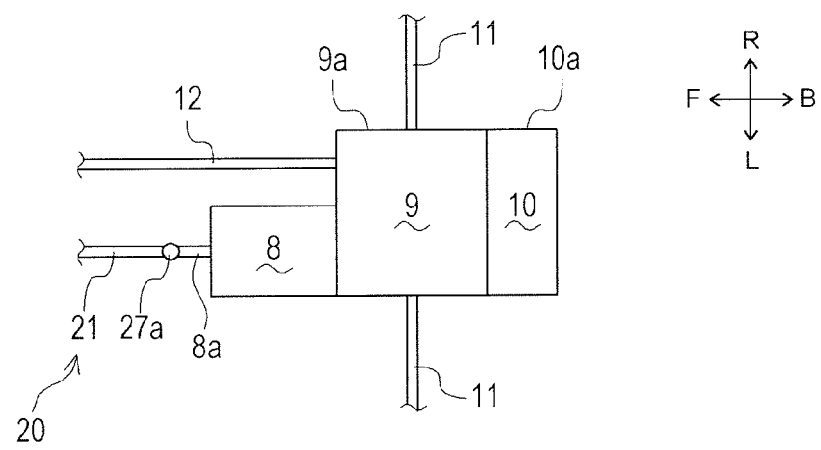
FIG. 13B is a schematic plan view showing an arrangement of an engine, a gear-type transmission device, and an HST according to a fifth embodiment.
Figure 13C:
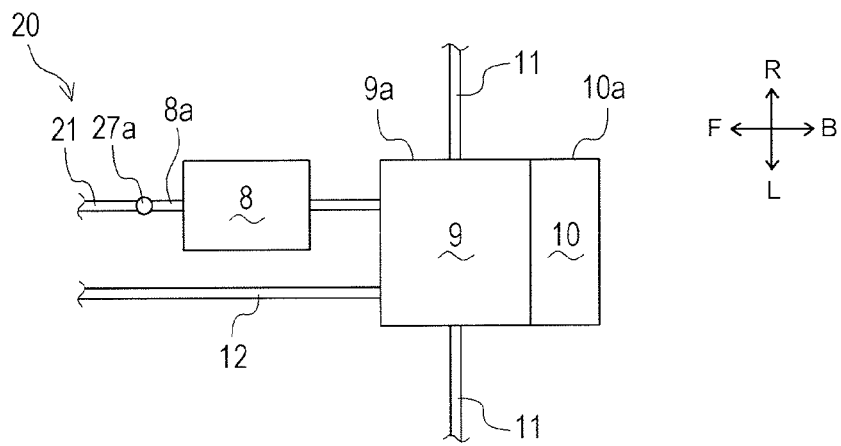
FIG. 13C is a schematic plan view showing an arrangement of an engine, a gear-type transmission device, and an HST according to a sixth embodiment.

In the working vehicle according to the first embodiment, as shown in FIG. 13A, the engine 8 is fixed to the right side of the front side surface of the transmission case 9a. However, in the working vehicle according to the fifth embodiment (see FIG. 13B), an engine 8 is fixed to a left side of a front side surface of a transmission case 9a. In this case, a front wheel drive shaft 12 can be disposed in a frontwardly extending manner from a right side of the front side surface of the transmission case 9a.

In the working vehicle according to the sixth embodiment (see FIG. 13C), an engine 8 and a transmission case 9a are disposed in a spaced-apart manner from each other. In this manner, the engine 8 and the transmission case 9a may be disposed without being directly fixed to each other.

Figure 14A:
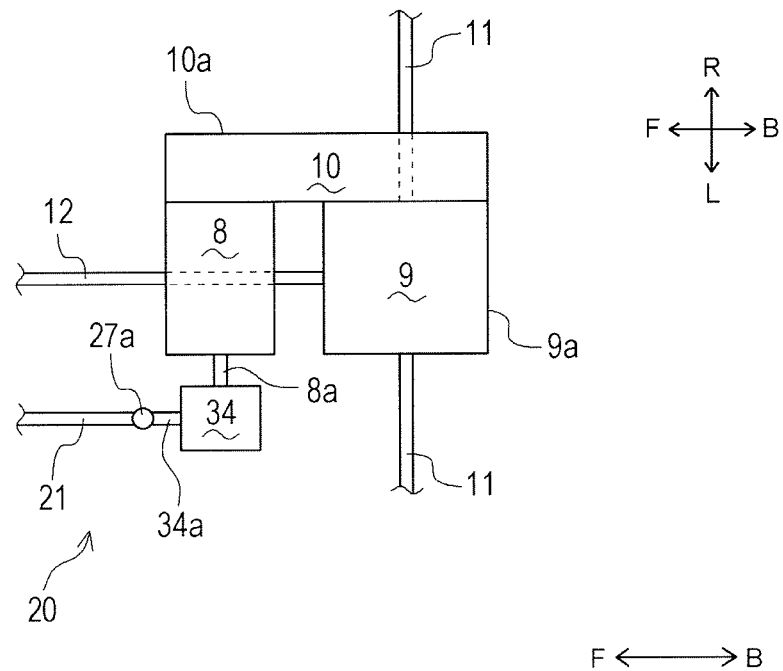
FIG. 14A is a schematic plan view showing an arrangement of an engine, a gear-type transmission device, and an HST according to a seventh embodiment.
Figure 14B:
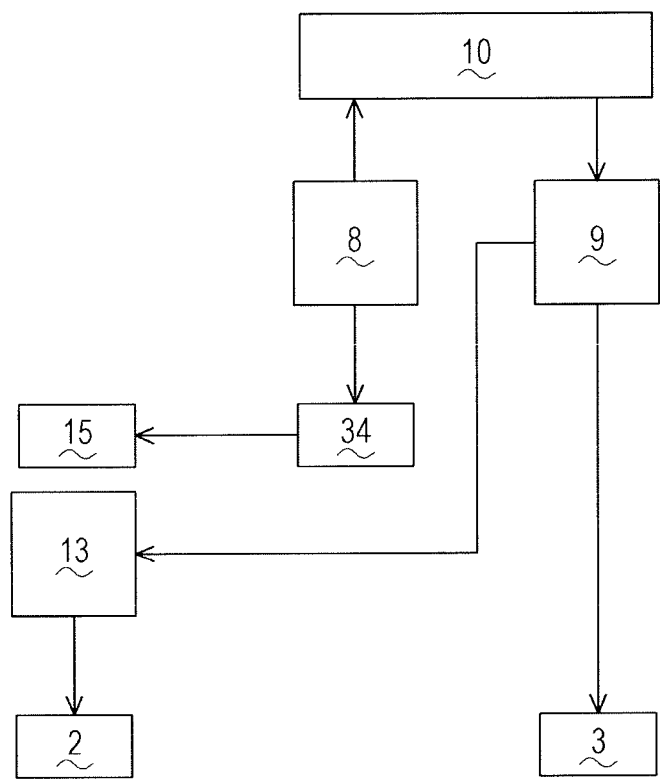
FIG. 14B is a block diagram showing a manner that power is transmitted in a working vehicle according to the seventh embodiment.

Next, a working vehicle according to a seventh embodiment is described with reference to FIG. 14.

In the working vehicle according to the first embodiment, as shown in FIG. 13A, the engine 8, the gear-type transmission device 9, and the HST 10 are disposed in a row in the longitudinal direction. However, an engine 8 and the like may be disposed as in the case of the working vehicle according to the seventh embodiment (see FIG. 14). Hereinafter, such an arrangement is described in detail.

In the working vehicle according to the seventh embodiment, the engine 8 is disposed such that the longitudinal direction of a crankshaft which is housed in the inside of the engine 8 is directed in the lateral direction of the working vehicle. A gear-type transmission device 9 which is housed in a transmission case 9a is disposed behind the engine 8. An HST 10 which is housed in an HST case 10a is disposed on a right side of the engine 8 and the transmission case 9a. A front end portion of a left side surface of the HST case 10a is fixed to a right side surface of the engine 8. A rear end portion of a left side surface of the HST case 10a is fixed to a right side surface of the transmission case 9a.

A mechanical power transmission mechanism 20 according to the seventh embodiment includes a power conversion mechanism 34. The power conversion mechanism 34 is provided for converting the rotation of the crankshaft of the engine 8 (that is, the rotation about an axis directed in the lateral direction) into the rotation of a rear transmission shaft 21 (that is, the rotation about an axis directed in the longitudinal direction). The power conversion mechanism 34 is disposed on a left side of the engine 8. The power conversion mechanism 34 is formed of gears, not shown (for example, a pair of bevel gears), shafts and the like, and an output shaft 34a. The power conversion mechanism 34 is connected to a power takeout shaft 8a which is connected to a left end portion of the crankshaft. The power conversion mechanism 34 can output power from the engine 8 transmitted to the power conversion mechanism 34 by way of the power takeout shaft 8a from the output shaft 34a which is disposed in a frontwardly projecting manner. The output shaft 34a is connected to the rear transmission shaft 21 by way of a first universal joint 27a.

In the working vehicle having the above-mentioned configuration, power from the engine 8 is transmitted to the HST 10 from a right end portion of the crankshaft, and a rotational speed is suitably changed by the HST 10. Power which is changed in speed by the HST 10 is transmitted to the gear-type transmission device 9, and is further changed in speed by the gear-type transmission device 9. Power which is transmitted with a speed change by the gear-type transmission device 9 is transmitted to left and right rear wheels 3 by way of rotary shafts 11. Further, power which is changed in speed by the gear-type transmission device 9 is transmitted to the left and right front wheels 2 by way of a front wheel drive shaft 12, a front wheel differential mechanism 13 and the like.

Power of the engine 8 is transmitted to the power conversion mechanism 34 from the left end portion of the crankshaft by way of the power takeout shaft 8a, and the rotational direction of power is changed over by the power conversion mechanism 34. The power is transmitted to a PTO shaft 15 by way of the output shaft 34a and the like.

As described in the seventh embodiment, the engine 8 may be disposed such that the longitudinal direction of the crankshaft which is housed in the inside of the engine 8 is directed in the lateral direction of the working vehicle.

In this case, the power conversion mechanism 34 is configured to transmit power from the engine 8 with a speed reduction and hence, it is possible to suppress whirling of the rear transmission shaft 21 and the like.

Next, a working vehicle according to an eighth embodiment is described with reference to FIG. 15.

In the working vehicle according to the eighth embodiment, in the same manner as the working vehicle according to the seventh embodiment (see FIG. 14), an engine 8 is disposed such that the longitudinal direction of a crankshaft is directed in the lateral direction. Further, a mechanical power transmission mechanism 20 according to the eighth embodiment transmits power from the engine 8 to a speed reduction mechanism 38 using a belt 37. Hereinafter, specific description is made.

The mechanical power transmission mechanism 20 according to the eighth embodiment includes a rear pulley 35, a front pulley 36, the belt 37, and the speed reduction mechanism 38. The rear pulley 35 is connected to a power takeout shaft 8a of the engine 8. The speed reduction mechanism 38 is connected to a PTO shaft 15 which is disposed on a front portion of the working vehicle. An input shaft 38a for inputting power to the speed reduction mechanism 38 is provided in a leftwardly projecting manner from the speed reduction mechanism 38. The front pulley 36 is connected to the input shaft 38a of the speed reduction mechanism 38. The belt 37 is extended between and wound around the rear pulley 35 and the front pulley 36, thus transmitting power from the rear pulley 35 to the front pulley 36.

In the working vehicle having the above-mentioned configuration, power from the engine 8 is transmitted to the rear pulley 35 from a left end portion of the crankshaft by way of the power takeout shaft 8a. The power is transmitted to the front pulley 36 by way of the belt 37, and is further transmitted to the speed reduction mechanism 38 from the input shaft 38a. The power is transmitted with a suitable speed reduction by the speed reduction mechanism 38 and is transmitted to the PTO shaft 15.

As described in the eighth embodiment, the mechanical power transmission mechanism 20 may be configured to transmit power from the engine 8 to the PTO shaft 15 using not only a shaft but also the belt 37.

The mechanical power transmission mechanism 20 according to the eighth embodiment may further include a clutch (a belt tension clutch) for changing over transmission of power by way of the belt 37 between a transmission mode and a non-transmission mode by changing a tension of the belt 37.

Further, the mechanical power transmission mechanism 20 may be configured to transmit power using a chain in place of the belt 37.

Figure 16A:
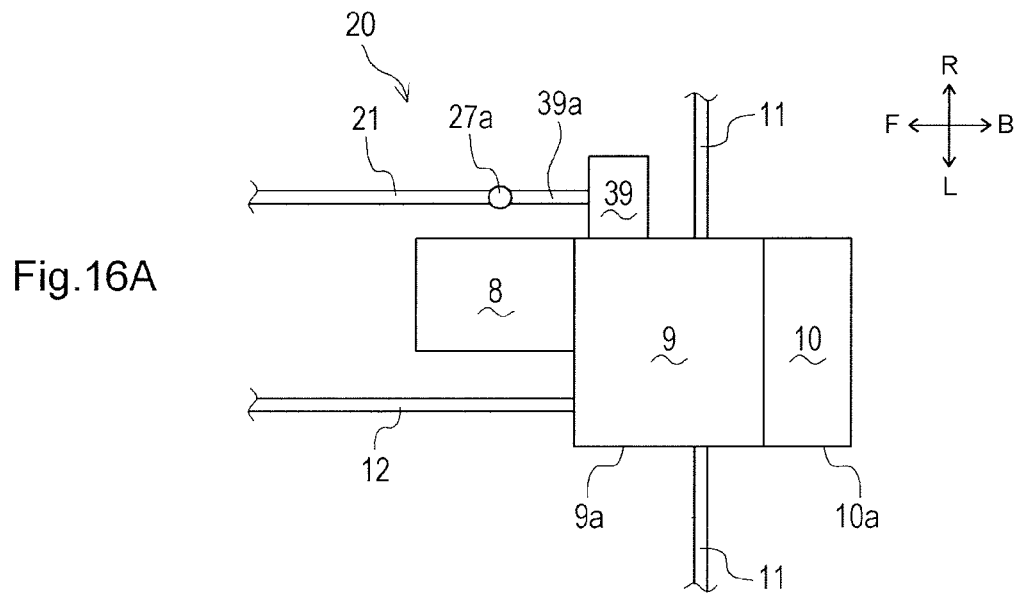
FIG. 16A is a schematic plan view showing a mechanical power transmission mechanism according to a ninth embodiment.
Figure 16B:
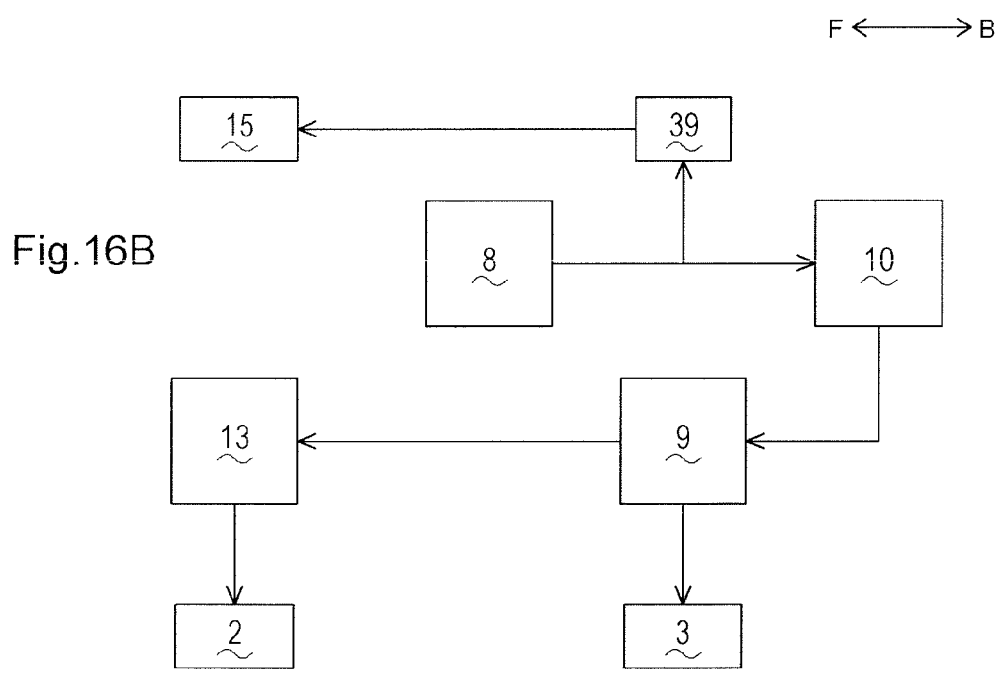
FIG. 16B is a block diagram showing a manner that power is transmitted in a working vehicle according to the ninth embodiment.

Next, a working vehicle according to a ninth embodiment is described with reference to FIG. 16.

Figure 5:
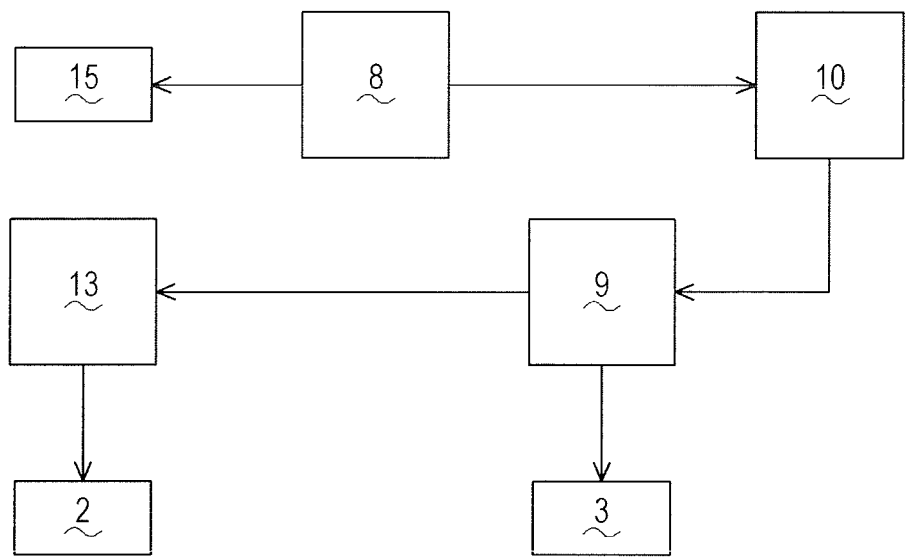
FIG. 5 is a block diagram showing a manner that power is transmitted in the working vehicle.

In the working vehicle according to the first embodiment, as shown in FIG. 5 and FIG. 13A, power taken out from the front side (the front end side of the crankshaft) of the engine 8 is transmitted to the PTO shaft 15 by way of the mechanical power transmission mechanism 20, and power taken out from the rear side (the rear end side of the crankshaft) of the engine 8 is transmitted to the HST 10. However, in the working vehicle according to the ninth embodiment, power taken out from a rear side of an engine 8 is transmitted to a PTO shaft 15 and an HST 10, respectively. Hereinafter, specific description is made.

A mechanical power transmission mechanism 20 according to the ninth embodiment includes a power takeout mechanism 39 in addition to the configuration of the mechanical power transmission mechanism 20 according to the first embodiment. The power takeout mechanism 39 is provided for taking out power to be transmitted to the HST 10 from a rear end portion of a crankshaft of the engine 8. The power takeout mechanism 39 is formed of gears, shafts and the like not shown, and power takeout shaft 39a. The power takeout mechanism 39 is fixed to a right side surface of a transmission case 9a. The power takeout mechanism 39 is connected to a shaft (not shown) which transmits power to the HST 10 from the rear end portion of the crankshaft in the inside of the transmission case 9a. The power takeout mechanism 39 can take out power from the engine 8 from the shaft before the power is changed in speed by the HST 10. Power which is taken out by the power takeout mechanism 39 is transmitted to a rear transmission shaft 21 from the power takeout shaft 39a which is provided in a frontwardly projecting manner form the power takeout mechanism 39.

In this manner, in the mechanical power transmission mechanism 20, the position where power is taken out can be arbitrarily selected provided that the mechanical power transmission mechanism 20 can take out power from the engine 8 before the power is changed in speed by the HST 10 and the gear-type transmission device 9 and can transmit the power to the PTO shaft 15.

The power takeout mechanism 39 may include a clutch for changing over the transmission of power by way of the power takeout mechanism 39 between a transmission mode and a non-transmission mode.

Next, a working vehicle according to a tenth embodiment is described with reference to FIG. 17 and FIG. 18.

As shown in FIG. 1 to FIG. 3, the working vehicle according to the first embodiment adopts a two-row seat specification (a seat specification thereof is changed over between a two-row seat specification and a one-row seat specification). However, the working vehicle according to the tenth embodiment adopts a one-row seat specification.

To be more specific, a driving operation part 6 of the working vehicle according to the tenth embodiment is not divided into front and rear parts. The driving operation part 6 includes a deck plate 6f having a horizontal floor surface, and a seat 6g on which an operator sits is mounted on the horizontal floor surface.

In this manner, also in the working vehicle which adopts the one-row seat specification, a mechanical power transmission mechanism 20 can be provided in the same manner as the first embodiment. To avoid the interference between the mechanical power transmission mechanism 20 and a driving operation part 6 (to arrange the mechanical power transmission mechanism 20 below the driving operation part 6), an inclination angle of a rear transmission shaft 21 in the vertical direction is set to a suitable angle. For example, in the working vehicle according to the first embodiment (see FIG. 3), the rear deck plate 6d of the rear row part 6R which is disposed just in front of the engine 8 is disposed at the position higher than the position of the front deck plate 6a of the front row part 6F disposed in front of the rear deck plate 6d and hence, even when the inclination angle of the rear transmission shaft 21 is set to a gentle angle, there is no possibility that the mechanical power transmission mechanism 20 and the driving operation part 6 interfere with each other. However, the working vehicle according to the tenth embodiment (see FIG. 18) is not provided with the rear row part 6R and hence, it is necessary to set an inclination angle of the rear transmission shaft 21 steeper than the inclination angle of the rear transmission shaft 21 in the first embodiment to avoid the interference between the mechanical power transmission mechanism 20 and the driving operation part 6.

Figure 17:
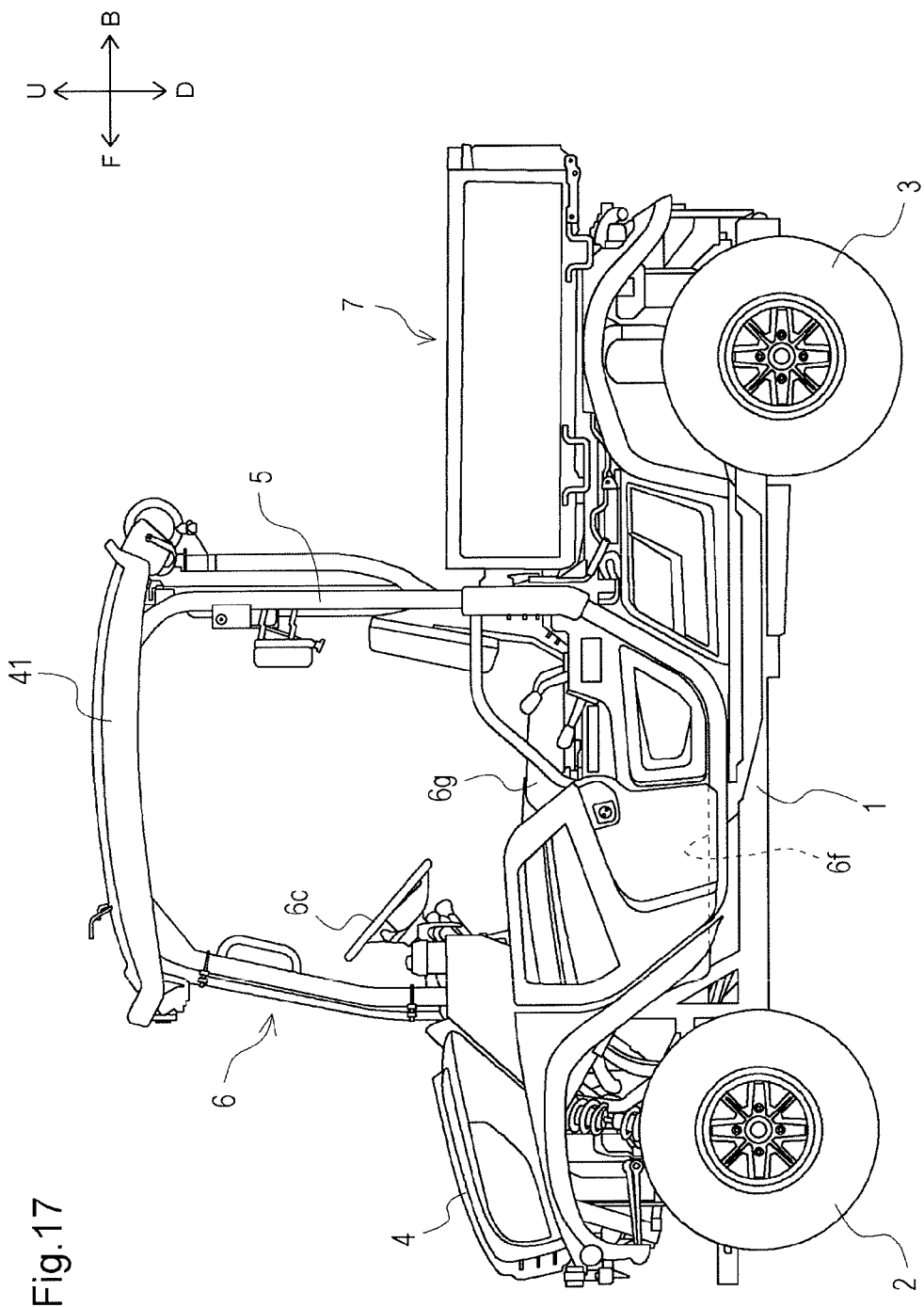
FIG. 17 is a side view showing an overall configuration of a working vehicle according to a tenth embodiment.
Figure 18:
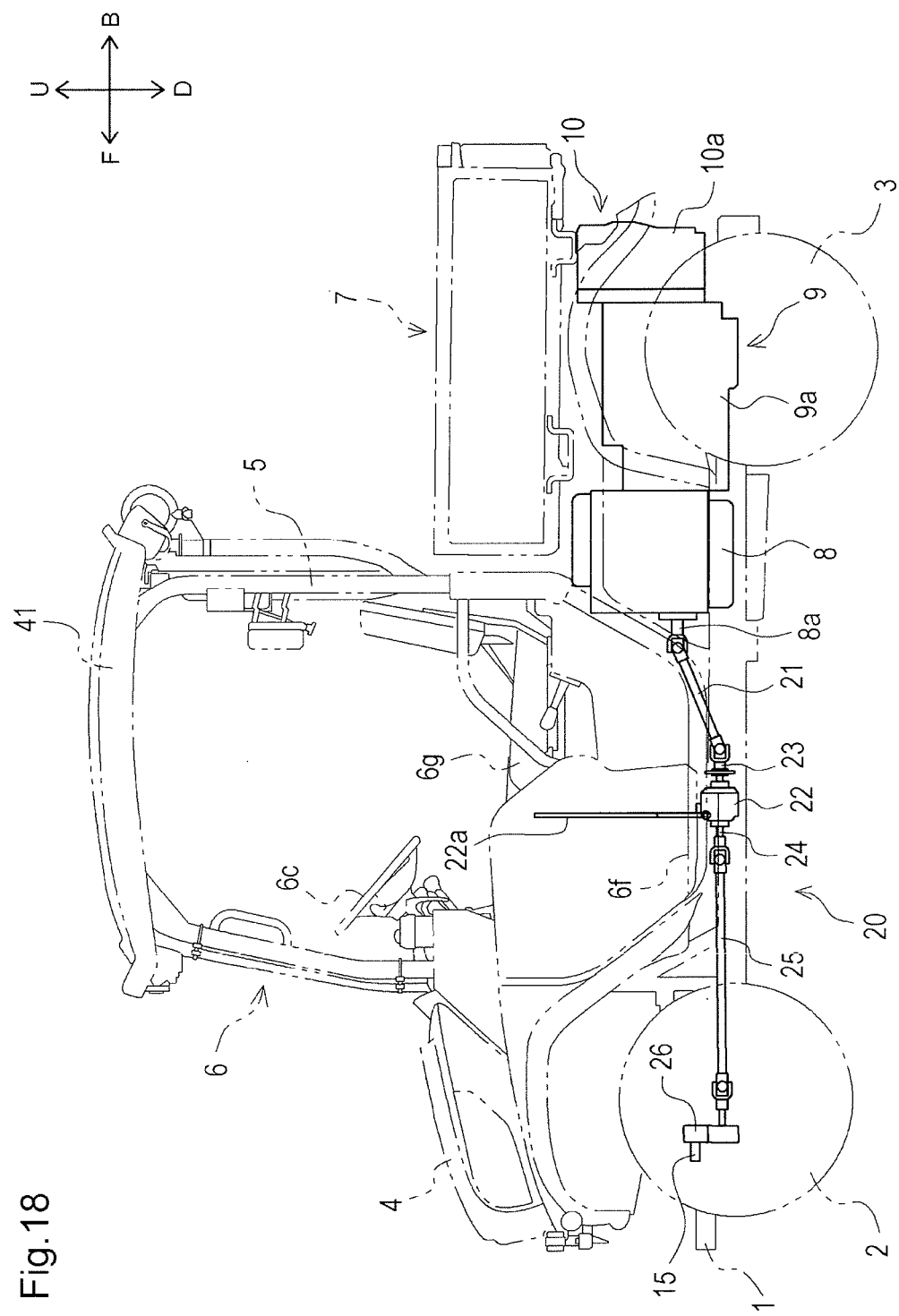
FIG. 18 is a side view showing a configuration relating to a power transmission path in the working vehicle according to the tenth embodiment.

As shown in FIG. 17, a roof 41 is mounted on an upper portion of a protective frame 5 of the working vehicle according to the tenth embodiment. Hereinafter, the configuration of left and right end portions of the roof 41 is described. The roof 41 is constituted in substantially left and right symmetry. Accordingly, in the description made hereinafter, only the configuration of the left end portion of the roof 41 and an area in the vicinity of the left end portion are described, while the description of the configuration of the right end portion of the roof 41 and an area in the vicinity of the right end portion are omitted.

Figure 19:
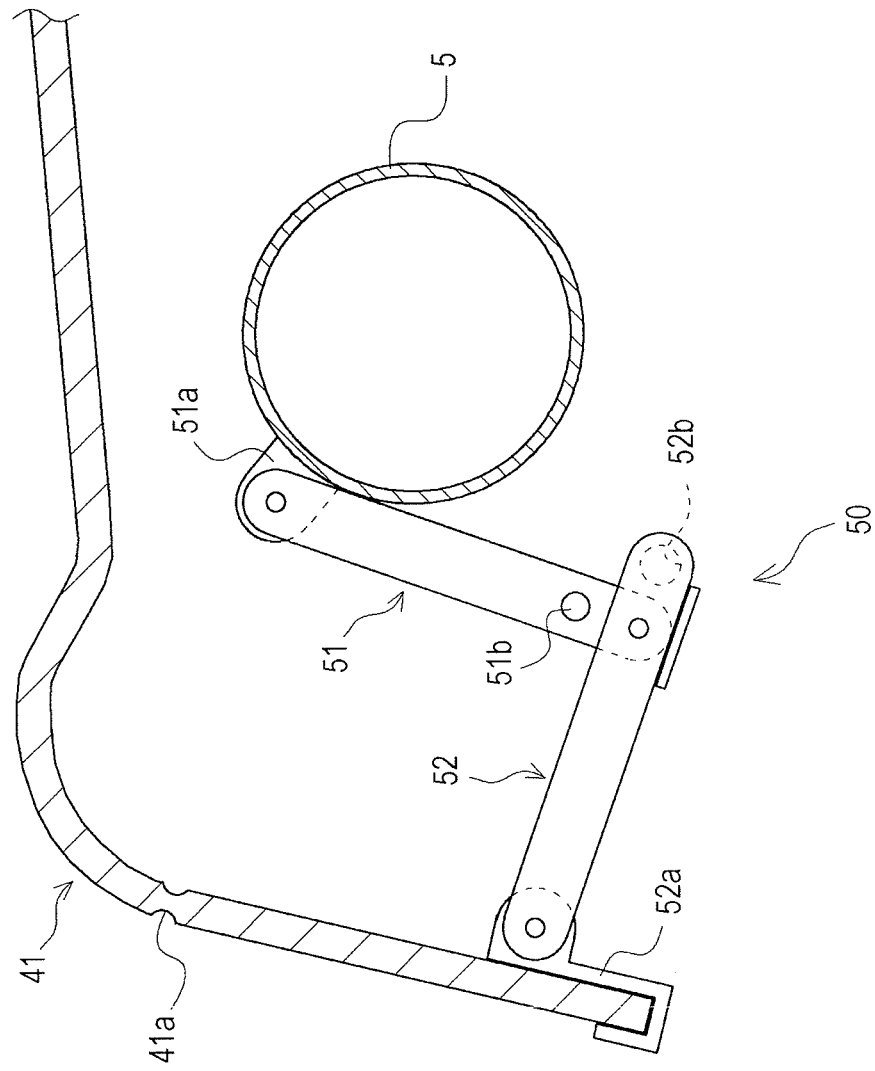
FIG. 19 is a cross-sectional back view showing a left end portion of a roof in a usual state.

As shown in FIG. 19 and FIG. 20, a roof angle adjustment mechanism 50 for changing an angle of the left end portion of the roof 41 is disposed in the vicinity of the left end portion of the roof 41. The roof angle adjustment mechanism 50 includes a first arm 51 and a second arm 52 as main components thereof.

The first arm 51 is formed of a substantially rectangular-plate-shaped member. One end (right end) of the first arm 51 is supported on an upper portion of the protective frame 5 by way of a frame-side support member 51a. The first arm 51 is connected to the frame-side support member 51a such that the first arm 51 is rotatable vertically relative to the frame-side support member 51a.

The second arm 52 is formed of a substantially rectangular-plate-shaped member. One end (left end) of the second arm 52 is supported on the left end portion of the roof 41 by way of a roof-side support member 52a. The second arm 52 is connected to the roof-side support member 52a such that the second arm 52 is vertically rotatable relative to the roof-side support member 52a. A portion of the second arm 52 in the vicinity of the other end (right end) portion of the second arm 52 is rotatably connected to the other end (left end) of the first arm 51.

A small wall thickness portion 41a of the roof 41 having a thickness smaller than a thickness of other portions of the roof 41 is formed in the vicinity of the left end portion of the roof 41 (a portion of the roof 41 away from the left end portion by a predetermined distance). By allowing the roof 41 to be resiliently deformable at the small wall thickness portion 41a, the left end portion of the roof 41 can be rotated in the vertical direction.

In the roof 41 having the above-mentioned configuration, as shown in FIG. 19, usually, the left end portion of the roof 41 is in a state where the left end portion is substantially directed downward. To change an angle of the left end portion of the roof 41, an operator pushes the left end portion of the roof 41 outward (in the leftward and upward direction). Due to such operation, the roof 41 is resiliently deformed at the small wall thickness portion 41a so that the left end portion of the roof 41 is rotated leftward and upward about the small wall thickness portion 41a.

As shown in FIG. 20, when the left end portion of the roof 41 is rotated leftward and upward (outward) at maximum (when the first arm 51 and the second arm 52 are disposed on the same straight line as viewed in a back view), a spherical body 51b which is mounted on a portion of the first arm 51 in the vicinity of the left end portion of the first arm 51 is fitted in a recessed portion 52b which is formed on a right end of the second arm 52. The spherical body 51b is pushed to a second arm 52 side (rearward) by a compression spring 51c. Due to such configurations, the rotational positions of the first arm 51 and the second arm 52 are held at such positions. Accordingly, the left end portion of the roof 41 can be held in a state where the left end portion is rotated outward at the maximum.

To return the left end portion of the roof 41 to an original state (see FIG. 19), an operator pulls down a connection portion between the first arm 51 and the second arm 52. When the spherical body 51b is removed from the recessed portion 52b due to such operation, the left end portion of the roof 41 is returned to an original angle.

For example, usually (in a state where there is no rain), the left end portion of the roof 41 substantially takes a state where the left end portion is directed downward (see FIG. 19). When it rains, by outwardly expanding the left end portion of the roof 41 (see FIG. 20), rain fallen on the roof 41 minimally drops into the inside of the driving operation part 6. That is, an operator riding on the driving operation part 6 minimally gets wet with rain. In this manner, only when necessary, the left end portion of the roof 41 is outwardly expanded so that the operator minimally gets wet with rain. On the other hand, usually, the left end portion of the roof 41 is directed downward and hence, there is no possibility that the design of the working vehicle is impaired, and it is also possible to prevent the left end portion of the roof 41 from obstructing the traveling and operation. Further, in the above-mentioned roof angle adjustment mechanism 50, an operator can manually change an angle of the left end portion of the roof 41 and hence, it is unnecessary to use a tool or the like for changing such an angle.

As the working vehicle, a working vehicle provided with a cabin 60 which covers a driving operation part 6 as shown in FIG. 21 is considered. Hereinafter, a sun shade 64 mounted on the cabin 60 is described.

The cabin 60 includes a front glass 61 which is disposed on a front side, a rear glass 62 which is disposed on a rear side, and a roof 63 which covers the driving operation part 6 from above. Further, the roof 63 includes an inner roof 63a which faces an inner side (driving operation part 6) of the cabin 60, and an outer roof 63b which faces an outer side of the cabin 60.

The sun shade 64 is stored in a gap between the inner roof 63a and the outer roof 63b. The sun shade 64 is formed by vapor depositing aluminum 64b on a surface (upper surface) of a rectangular-sheet-shaped polyethylene form 64a. A front end portion of the sun shade 64 is connected to a front end portion of the inner roof 63a by way of a tension spring 65. A rear end portion of the sun shade 64 is guided to the inside of the cabin 60 (to the inside of the driving operation part 6) through a rear side of the inner roof 63a.

The sun shade 64 having the above-mentioned configuration is usually pulled into the inside of the roof 63 by the tension spring 65. Here, the sun shade 64 is stored in a gap formed between the inner roof 63a and the outer roof 63b in a state where the sun shade 64 is stretched in a sheet shape. In this case, the sun shade 64 can be utilized as a heat insulation member of the roof 63. That is, the transfer of heat through the roof 63 can be suppressed by the sun shade 64, thus suppressing the increase of a temperature (room temperature) in the cabin 60.

By pulling down a rear end portion of the sun shade 64 and suitably fixing the sun shade 64 at an arbitrary position, it is possible to cover the inside of the rear glass 62 with the sun shade 64. Due to such a configuration, it is possible to block light (sun light) emitted to the inside of the cabin 60 through the rear glass 62. In storing the sun shade 64 in the roof 63 again, when an operator releases the fixing of the sun shade 64, the sun shade 64 is pulled into the inside of the roof 63 due to a tension of the tension spring 65.

In this manner, the sun shade 64 can be mounted on the cabin 60 with the simple configuration which uses the tension spring 65. Further, when the sun shade 64 is stored in the inside of the roof 63, the sun shade 64 is not pulled by winding but is pulled while keeping a sheet shape thereof and hence, the sun shade 64 can be utilized as a heat insulation member of the roof 63.

What is claimed is:

1. A working vehicle comprising:
    an engine disposed on a rear portion of a vehicle body;
    the engine including a crankshaft extending in a longitudinal direction, said longitudinal direction being a longitudinal direction of the vehicle;
    a transmission disposed on the rear portion of the vehicle body and configured to transmit power from the engine to a drive wheel with a speed change;
    a load-carrying platform disposed above at least one of the engine and the transmission;
    a driving operation part disposed in front of the load-carrying platform and allowing an operator to ride thereon;
    a PTO shaft mounted on a front portion of the vehicle body and being capable of taking out power to the outside of the working vehicle;
    a mechanical power transmission mechanism for transmitting the power from the engine via a power transmission shaft to the PTO shaft, the power from the engine to the PTO shaft not being transmitted with a speed change by the transmission;
    the mechanical power transmission shaft being configured to receive power from a longitudinal front of the engine and to extend longitudinally from the longitudinal front of the engine to transmit power from the engine to the PTO shaft; and
    the mechanical power transmission mechanism extending below the driving operation part.

2. The working vehicle as claimed in claim 1, wherein the mechanical power transmission mechanism includes: a speed reduction mechanism for reducing a speed of the power transmitted to the PTO shaft from the engine.

3. The working vehicle as claimed in claim 1, wherein the PTO shaft is provided at a position higher than the leg placing surface of the driving operation part.

4. The working vehicle as claimed in claim 1, wherein:
the engine comprises a crankshaft; and
the power takeout shaft is connected to the crankshaft.

5. The working vehicle as claimed in claim 1, wherein:
the engine comprises a crankshaft;
the power takeout shaft is connected to a first end of the crankshaft; and
the transmission is connected to a second end of the crankshaft.

6. The working vehicle as claimed in claim 1, wherein the mechanical power transmission mechanism includes a power transmission shaft disposed in an extending manner in the longitudinal direction of the vehicle body.

7. The working vehicle as claimed in claim 6, wherein the PTO shaft is provided at a position higher than the leg placing surface of the driving operation part.

8. The working vehicle as claimed in claim 6, wherein the power transmission shaft is formed of one transmission shaft disposed over a range from the rear portion to the front portion of the vehicle body, having a rear end thereof connected to a power takeout portion from which the takeout of power from the engine is allowed, and having a front end thereof connected to the PTO shaft.

9. The working vehicle as claimed in claim 6, wherein the mechanical power transmission mechanism includes: a speed reduction mechanism for reducing a speed of the power transmitted to the PTO shaft from the engine.

10. The working vehicle as claimed in claim 9, wherein the speed reduction mechanism is disposed on a front portion of the vehicle body, and is configured so as to connect the power transmission shaft and the PTO shaft.

11. The working vehicle as claimed in claim 10, wherein the PTO shaft is configured to project toward a front side from the speed reduction mechanism, and is disposed at a position where the speed reduction mechanism does not overlap with a front end of the power transmission shaft as viewed in a front view.

12. The working vehicle as claimed in claim 6, wherein the power transmission shaft includes:
a first transmission shaft having a rear end thereof connected to a power takeout portion from which the takeout of power from the engine is allowed, and having a front end thereof disposed in a frontwardly and downwardly extending manner; and
a second transmission shaft having a rear end thereof connected to a front end of the first transmission shaft by way of a universal joint, and having a front end thereof connected to the PTO shaft.

13. The working vehicle as claimed in claim 12, wherein the PTO shaft is provided at a position higher than the leg placing surface of the driving operation part.

14. The working vehicle as claimed in claim 12, wherein the power takeout portion is provided at a position higher than a leg placing surface of a driving operation part.

15. The working vehicle as claimed in claim 14, wherein the PTO shaft is provided at a position higher than the leg placing surface of the driving operation part.

16. The working vehicle as claimed in claim 12, wherein the mechanical power transmission mechanism includes: a speed reduction mechanism for reducing a speed of the power transmitted to the PTO shaft from the engine.

17. The working vehicle as claimed in claim 16, wherein the power takeout portion is provided at a position higher than a leg placing surface of a driving operation part.

18. The working vehicle as claimed in claim 16, wherein the speed reduction mechanism is disposed on a front portion of the vehicle body, and is configured so as to connect the power transmission shaft and the PTO shaft.

19. The working vehicle as claimed in claim 18, wherein the power takeout portion is provided at a position higher than a leg placing surface of a driving operation part.

20. The working vehicle as claimed in claim 18, wherein the PTO shaft is configured to project toward a front side from the speed reduction mechanism, and is disposed at a position where the speed reduction mechanism does not overlap with a front end of the power transmission shaft as viewed in a front view.

21. The working vehicle as claimed in claim 20, wherein the power takeout portion is provided at a position higher than a leg placing surface of a driving operation part.

22. The working vehicle as claimed in claim 21, wherein the PTO shaft is provided at a position higher than the leg placing surface of the driving operation part.

23. A working vehicle comprising:
an engine disposed on a rear portion of a vehicle body;
the engine including a crankshaft extending in a longitudinal direction, said longitudinal direction being a longitudinal direction of the vehicle;
a transmission disposed on the rear portion of the vehicle body and configured to transmit power from the engine to a drive wheel with a speed change;
a load-carrying platform disposed above at least one of the engine and the transmission;
a driving operation part disposed in front of the load-carrying platform and allowing an operator to ride thereon;
a PTO shaft mounted on a front portion of the vehicle body and being configured to supply power outside of the working vehicle;
a mechanical power transmission mechanism comprising a power transmission shaft that is configured to receive power from a longitudinal front of the engine and to extend longitudinally from the longitudinal front of the engine to transmit power from the engine to the PTO shaft;
the mechanical power transmission mechanism being connected to a first end of the engine; and
the transmission being connected to a second end of the engine.

24. The working vehicle as claimed in claim 23, wherein the mechanical power transmission mechanism transmits power from the engine to the PTO shaft, the mechanical power transmission mechanism not being transmitted with a speed change by the transmission.

25. The working vehicle as claimed in claim 23, wherein the first end of the engine is a front end of the engine and the second end of the engine is a rear end of the engine.

26. The working vehicle as claimed in claim 23, wherein:
the engine comprises a crankshaft and a power takeout shaft;
a first end of the power takeout shaft is connected to a first end of the crankshaft; and
the mechanical power transmission mechanism is connected to a second end of the power takeout shaft.

* * * * *